(12) United States Patent
Loiacono

(10) Patent No.: US 6,175,841 B1
(45) Date of Patent: *Jan. 16, 2001

(54) COMPUTERIZED SYSTEMS FOR PRODUCING ON-LINE INSTRUCTIONAL MATERIALS

(75) Inventor: Ronald Loiacono, Salinas, CA (US)

(73) Assignee: Bookette Software Company, Monterey, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/896,226

(22) Filed: Jul. 17, 1997

Related U.S. Application Data

(60) Provisional application No. 60/022,798, filed on Jul. 26, 1996.

(51) Int. Cl.⁷ ................................................. G06F 15/00
(52) U.S. Cl. .................. 707/512; 707/508; 707/507; 434/353; 434/354
(58) Field of Search ................................. 707/507, 508, 707/512; 434/324, 346, 347, 353, 354; 345/333, 334, 335

(56) References Cited

U.S. PATENT DOCUMENTS

| | | | |
|---|---|---|---|
| 3,643,348 | * | 2/1972 | Azure, Jr. .............................. 434/353 |
| 3,827,165 | * | 8/1974 | Jacobson .............................. 434/354 |
| 4,978,305 | * | 12/1990 | Kraft .................................... 434/353 |
| 5,035,625 | * | 7/1991 | Munson et al. ...................... 434/332 |
| 5,115,501 | * | 5/1992 | Kerr ..................................... 395/600 |
| 5,180,309 | * | 1/1993 | Egnor ................................... 343/353 |
| 5,261,042 | * | 11/1993 | Brandt ................................. 395/156 |
| 5,293,422 | * | 3/1994 | Loiacono . |
| 5,321,611 | * | 6/1994 | Clark et al. ........................ 364/419.2 |
| 5,433,615 | * | 7/1995 | Clark .................................... 434/322 |
| 5,444,840 | * | 8/1995 | Froessl ..................................... 707/2 |
| 5,559,942 | * | 9/1996 | Gough et al. ........................ 707/512 |
| 5,577,188 | * | 11/1996 | Zhu ...................................... 707/512 |
| 5,581,682 | * | 12/1996 | Anderson et al. .................... 707/530 |
| 5,596,700 | * | 1/1997 | Darnell et al. ....................... 707/512 |
| 5,672,060 | * | 9/1997 | Poor .................................... 434/322 |
| 5,690,497 | * | 11/1997 | Clark et al. .......................... 434/322 |
| 5,711,673 | * | 1/1998 | Grundy, Jr. .......................... 434/353 |
| 5,760,768 | * | 6/1998 | Gram ................................... 345/333 |
| 5,893,126 | * | 9/1999 | Drews et al. ........................ 707/512 |
| 5,947,747 | * | 9/1999 | Walker et al. ....................... 434/354 |

OTHER PUBLICATIONS

Lockwood, Distributed Learning via the World Wide Web throught Interactive Module, IEEE Internation Conference, pp. 101–102, Jul. 1997.*

Macromedia Inc.'s product brochure entitled "Macromedia Director 6 Multimedia Studio: The Most Powerful Tools for Multimedia and the Web," San Francisco, California, 1997.*

Macromedia Inc. 's product brochure entitled "Macromedia Authorware Version 3: The Most Powerful Authoring Environment for Interactive Information," San Francisco, California, 1995.*

* cited by examiner

*Primary Examiner*—Stephen S. Hong
*Assistant Examiner*—Cong-Lac Huynh
(74) *Attorney, Agent, or Firm*—Maurice M. Klee

(57) ABSTRACT

A computerized system for efficiently transforming educational materials composed of questions and answers into an on-line computer interactive form is provided. Computer readable images of pages of textual and/or graphical material are created by, for example, optical scanning of paper and pencil test sheets. The captured images are modified by the application of answer formats, examples of which include underlining, highlighting, circling a correct answer, and the like. The modified captured images are stored on, for example, computer disks for distribution to users. When the disks are used, answer formats are automatically applied to the questions thus allowing them to be answered in a computer interactive form.

16 Claims, 38 Drawing Sheets

FIG.1

State Capitals

Match the state with the correct capital.

Alaska ● ● Helena

Washington ● ● Boise

Montana ● ● Dover

Idaho ● ● Juneau

New York ● ● Olympia

Delaware ● ● Albany

State Capitals

Match the state with the correct capital.

Alaska — Helena
Washington — Boise
Montana — Dover
Idaho — Juneau
New York — Olympia
Delaware — Albany

FIG. 28

```
50
For each item, place cursor at
desired fill in the blank icon
location using GetLogicalPos
and PtInRect and click the left
mouse button.
```
↓
```
51
Enter correct answer to
fill in the blank question
using EditControl.
```
↓
```
52
Place cursor outside
icon boundary and click
left mouse button.
```
↓
```
53
Write coordinates of fill in
the blank icon and correct
answer to overlay record.
```

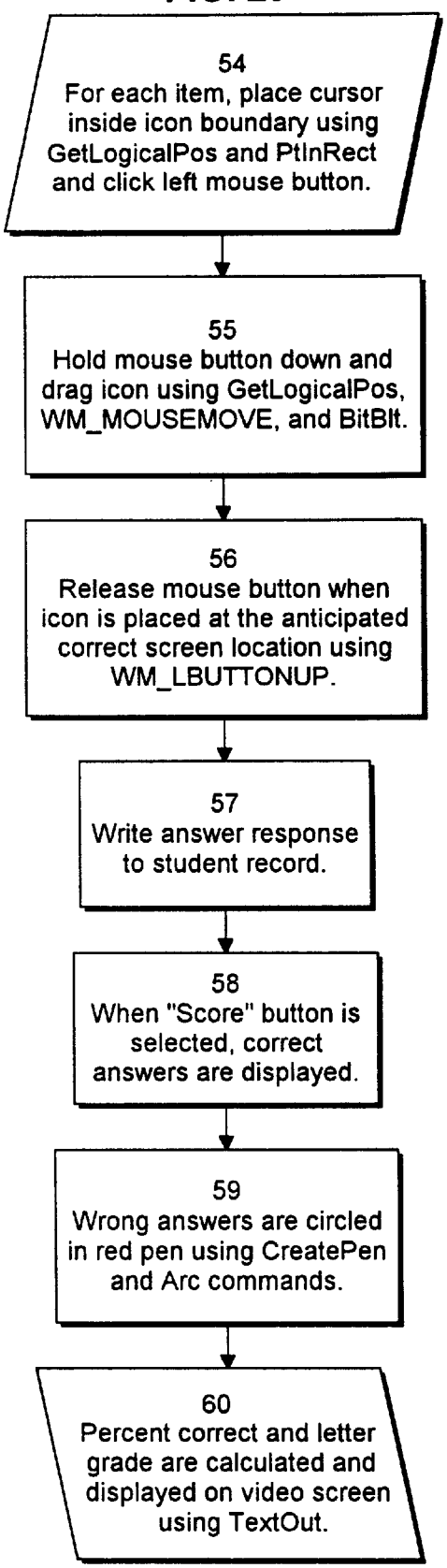

COMPUTERIZED SYSTEMS FOR PRODUCING ON-LINE INSTRUCTIONAL MATERIALS

CROSS REFERENCE TO RELATED PROVISIONAL APPLICATION

This application claims the benefit under 35 USC §119(e) of U.S. Provisional Application Serial No. 60/022,798 filed Jul. 26, 1996.

FIELD OF THE INVENTION

This invention relates to computerized systems for producing instructional, tutorial, and testing materials in an on-line computer usable form.

BACKGROUND OF THE INVENTION

Educators, government administrators, and policy makers have recognized the great value of computers in education, and computers are becoming ever more present in the classroom. To date, the approach in producing educational materials for computers has been highly inefficient and expensive. Instructional designers and software engineers have been charged with the task of designing and implementing instructional materials from the ground up.

Some efforts have been made to use authoring software to produce instructional materials, such as the software sold under the trademarks AUTHORWARE and DIRECTOR by Macromedia, Inc. (San Francisco, Calif.). Similar software has been sold by Asymetrix Corp. (Seattle, Wash.) under the trademark MULTIMEDIA TOOLBOOK. Although such software has improved the process somewhat, it has not eliminated the need for software engineers. The authoring software available to date has in essence been a computer language which has required special expertise to use. Accordingly, the production of computer usable instructional materials with such software has involved investments of large sums of money for even relatively small projects.

What has been missing in the art is an efficient and inexpensive procedure for converting educational materials to on-line computer usable form. A common feature of most educational materials, whether they be used for instruction or testing, is the presentation of questions and the recording of responses in a paper and pencil form. Examples of this educational approach begin in elementary school and continue to the highest levels of education. Literally millions of pages of workbooks and tests exist having this form, and more are being created every day. The current approaches to creating computer usable educational materials have no practical way of accessing this base of existing materials. The present invention is directed to solving this important problem in the art.

DESCRIPTION OF THE INVENTION

In view of the foregoing, it is an object of the present invention to provide a computerized system for efficiently transforming educational materials composed of questions and answers into an on-line computer interactive form.

The invention achieves this object by creating interactive computer readable "books" composed of computer readable "pages" which contain questions to be answered by a user. The computer readable books can exist on diskettes, CD-ROMS, portions of a hard drive, the INTERNET, or the like. The books and pages thereof are "computer readable" in that they can be read by a computer and presented to a reader on-line. In accordance with the invention, such books are produced by:

(a) creating a computer readable image of a page of textual and/or graphical material for the computer readable book, said page including at least one question requiring an answer by a user;

(b) displaying the computer readable image created in step (a) on a video monitor;

(c) selecting an answer format from a plurality of answer formats;

(d) modifying the computer readable image by applying the answer format to that image;

(e) identifying a correct answer to the at least one question; and (f) storing the modified computer readable image and the correct answer in a computer storage medium.

Step (a) allows the author of a computer readable book to use existing "paper and pencil" type instructional materials. Specifically, in accordance with this step, all that the author needs to do is to scan existing materials in to a computer system to create computer readable images. Alternatively, the author can create a computer readable image using a word processing program, a graphics program, or a spreadsheet program. The computer readable image comprises a bit map, a metafile, or a similar data format capable of both display on a video screen in step (b) and modification in step (d). For ease of reference, the computer readable image of step (a) will be referred to as a "captured image" and the modified computer readable image of step (d) will be referred to as a "modified captured image."

Step (b) allows the author to view the captured image in real time and to modify it while on a video screen to make it on-line computer interactive. A variety of video monitors now known or developed in the future can be used to display the captured image.

Step (c) is a critical part of the invention which allows the author to select an answer format appropriate to the particular question which is being made computer interactive. Examples of answer formats include underlining, placing a circle, placing an "X", placing a box, highlighting, filling in a blank, filling in a blank from a set of choices, moving a portion of the image, connecting two portions of the image by a line or curve, and annotating a portion of the image. Other answer formats now known or subsequently developed can be used in the practice of the invention. The answer formats are presented to the author in, for example, a list from which the author selects an appropriate format for the particular question or group of questions which he or she is working on.

In step (d), the selected answer format is made a part of the captured image thus transforming that image into a modified captured image. A variety of approaches can be used to make this transformation. For example, in a WINDOWS environment, the transformation can be made using such commands as Rectangle, Arc, Polyline, BitBlp, CreatePen, CreateSolidBrush, CreateCompatibleDC, and CreateBitMap to modify the captured image. Being part of the modified captured image, the answer format is provided to the user at the time the instructional material is used interactively. None of the prior art uses of computers in connection with the generation of instructional materials has included the capability to apply answer formats to instructional materials so as to convert those materials to computer interactive form.

In step (e), a correct answer is associated with each of the questions which has been converted to computer interactive form. Such a correct answer is needed during the use of the computer readable book so that the user's responses can be scored. The invention allows correct answers to be associated with computer readable pages at the time of the creation of those pages so that correct answers are always readily available for further processing.

In step (f, the modified captured image and the correct answer(s) are stored on a computer storage medium, e.g., a hard disk, a floppy disk, an optical disk, or the like. Preferably, the modified captured image and the correct answer(s) are stored in a common file, although more than one file can be used for this purpose if desired.

The computer storage medium, or a copy thereof, is subsequently used in the on-line administration of the interactive instructional material to the user. If desired, control of the number of uses made of the interactive instructional material can be achieved in accordance with the procedures of Loiacono, U.S. Pat. No. 5,293,422, the relevant portions of which are incorporated herein by reference.

Preferably, as the instructional material is being used, a record is made of the user's responses in a computer storage medium, which preferably is the same computer storage medium used for the computer readable book, but can be a different storage medium, e.g., the computer readable book can be on an optical disk and the user's responses can be recorded on a hard drive or other magnet storage medium. The recordation of the user's responses allows an instructor to monitor a user's progress and to prepare progress reports as needed.

In addition to associating correct answers with the questions of the computer readable book, video and/or audio outputs can also be associated with specific questions and/or specific pages of the book. In this way, the instructor can communicate with the user by means of modalities other than text and graphics.

Textual material, e.g., instructional categories and scoring weights, can also be associated with specific questions and/or specific pages of the computer readable book. Such textual material can assist the instructor in planning and tracking the educational progress of individual students and groups of students using the interactive computer readable books.

In short, the invention for the first time provides a practical method for creating on-line computer interactive instructional materials and, in particular, provides a practical method for transforming existing instructional materials, e.g., classical "paper and pencil" type materials, to the modern educational environment.

The process of the invention is practiced on a digital computer system configured by suitable programming to perform the various operational steps.

The computer system can comprise a general purpose computer and its associated peripherals, such as the multimedia personal computers and peripherals currently being sold by Dell, Gateway, Compaq, Texas Instruments, Apple, IBM, Hewlett-Packard, and the like. Preferably, the computer system should include at least 4 megabits of RAM, a color monitor having at least VGA graphics, at least 10 megabytes of disk storage, and a 486 or higher processor, e.g., a PENTIUM processor. The system should also include an optical scanner and associated software for inputting "paper and pencil" type materials and may also include a CD-ROM drive, as well as capabilities for creating a CD-ROM master. The system's basic software preferably includes an operating system of the graphical type, e.g., a WINDOWS or MACINTOSH type system, which supports input through a mouse, a word processing program, a spreadsheet program, a graphics program, and programs which support audio and video input and output.

Software embodying the process of the invention can be written in various programming languages known in the art. A preferred programming language is the C language which is particularly well-suited to a graphical operating environment. Other languages which can be used include VISUAL BASIC, PASCAL, $C^{++}$, and the like.

For purposes of distribution and use, software written to practice the invention can be embodied as an article of manufacture comprising a computer usable medium, such as a magnetic disc, an optical disc, or the like, upon which the software is encoded.

BRIEF DESCRIPTION OF THE DRAWINGS

FIG. 1 shows an example of raw instructional material which can be used in the practice of the invention.

FIGS. 2–18 illustrate various screen displays generated during the practice of the invention.

FIGS. 19–38 are flow charts illustrating procedures for practicing various steps of the invention.

Figure 2:
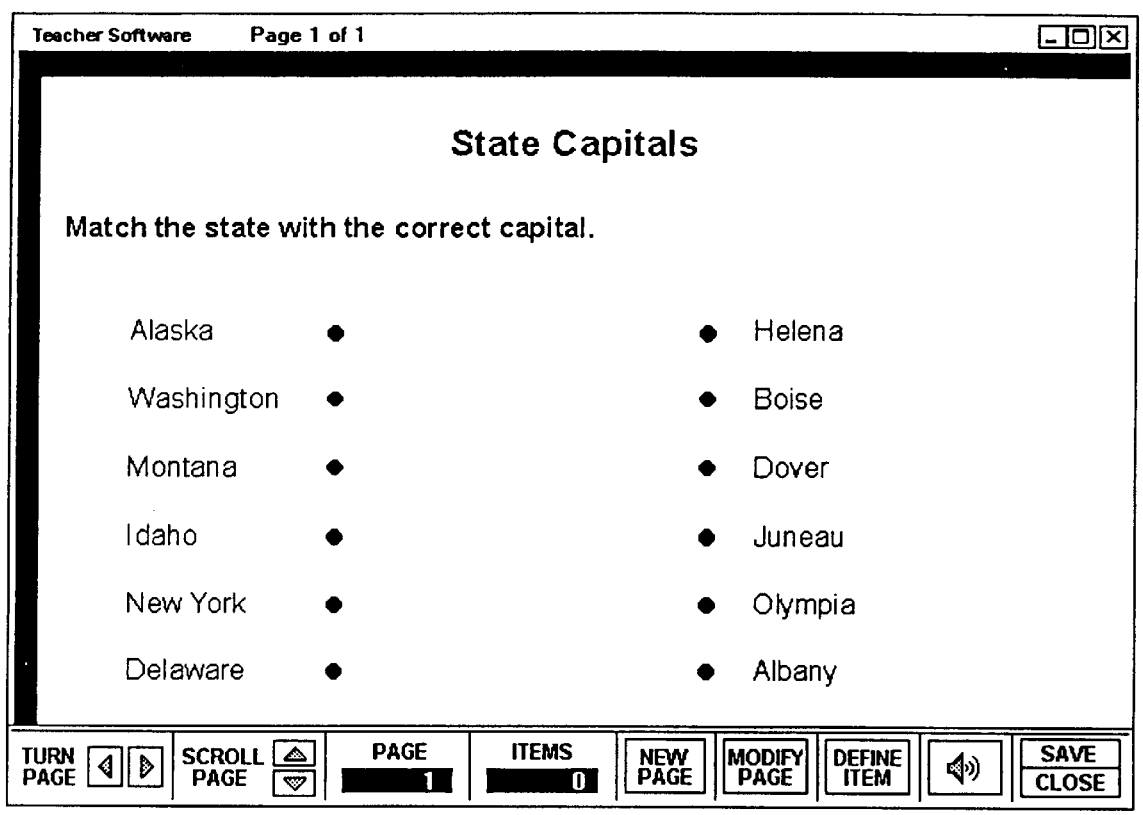

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the preparation of an on-line interactive computer readable book through the application of an answer format to a computer readable image.

FIGS. 1 to 7 illustrate a typical embodiment of the invention wherein a page of a computer readable book is created. In particular, these figures show the creation of a page of a computer readable book where the answer format applied to a computer readable image constitutes connecting portions of the image by lines, in particular, straight lines. The specific instructional material used in these figures involves the identification of state capitals for various states, it being understood, of course, that this instructional material is presented only for purposes of illustration and is not intended to limit the invention in any way.

FIG. 1 shows the raw material from which the computer readable image is created. The content of FIG. 1 could, for example, exist in paper and pencil form as part of a pre-existing set of instructional materials which a teacher has used in his or her teaching activities. In such a case, the paper and pencil form of the instructional material is scanned into a computer system using standard scanning equipment and software which creates a computer readable image (captured image) of the paper and pencil version of the instructional material. The computer readable image is preferably in a bitmap (BMP) format or an equivalent graphical format which is device independent, i.e., a format which can be used with a variety of screen resolutions.

Alternatively, the teacher can create the content of the instructional material using a stand-alone word processor, such as, MICROSOFT WORD, LOTUS WORDPRO, or the like. The stand-alone word processor should support the clipboard function so that a computer readable image can be produced by blocking the desired instructional materials and copying same to the clipboard. Preferably, the image copied to the clipboard is in a Metafile format. Alternatively, the format at the clipboard, e.g., a rich text format (RTF) format, can be converted to, for example, a Metafile format, by reading the RTF clipboard image into an intermediate file and then converting to a Metafile format which will then constitute the computer readable image used in later steps of the invention. Although the Metafile format is preferred because it presently constitutes an industry standard, other computer readable formats or formatting procedures now known or subsequently developed can be used in the practice of the invention, e.g., the OLE embedded document procedure.

Rather than a stand-alone word processor, a specialized word processor can be used in the practice of the invention to create the raw instructional material. Such a specialized word processor need not have all of the features of stand-alone word processor, e.g., footnoting can be omitted. Conversely, a specialized word processor can optionally have enhanced versions of some features which are useful in creating instructional materials, e.g., preset item numbering/bulleting and column generation for producing instructional material of the type shown in FIG. 1. As with the stand-alone word processor, a computer readable image must be produced from the output of the specialized word processor. This can be done in a manner invisible to the user by means of the clipboard function or in other ways known in the art, e.g., using a software development kit (SDK) for programming in WINDOWS which contains the appropriate Metafile commands.

Once the computer readable image (captured image) has been created, it is displayed to the user on a video screen. FIG. 2 shows the result of applying this step of the process to the raw instructional data of FIG. 1. As can be seen in FIG. 2, the raw instructional data of FIG. 1 is now surrounded by computer screen borders which contain tool bars by which the user can interact with the image on the screen.

Figure 3:
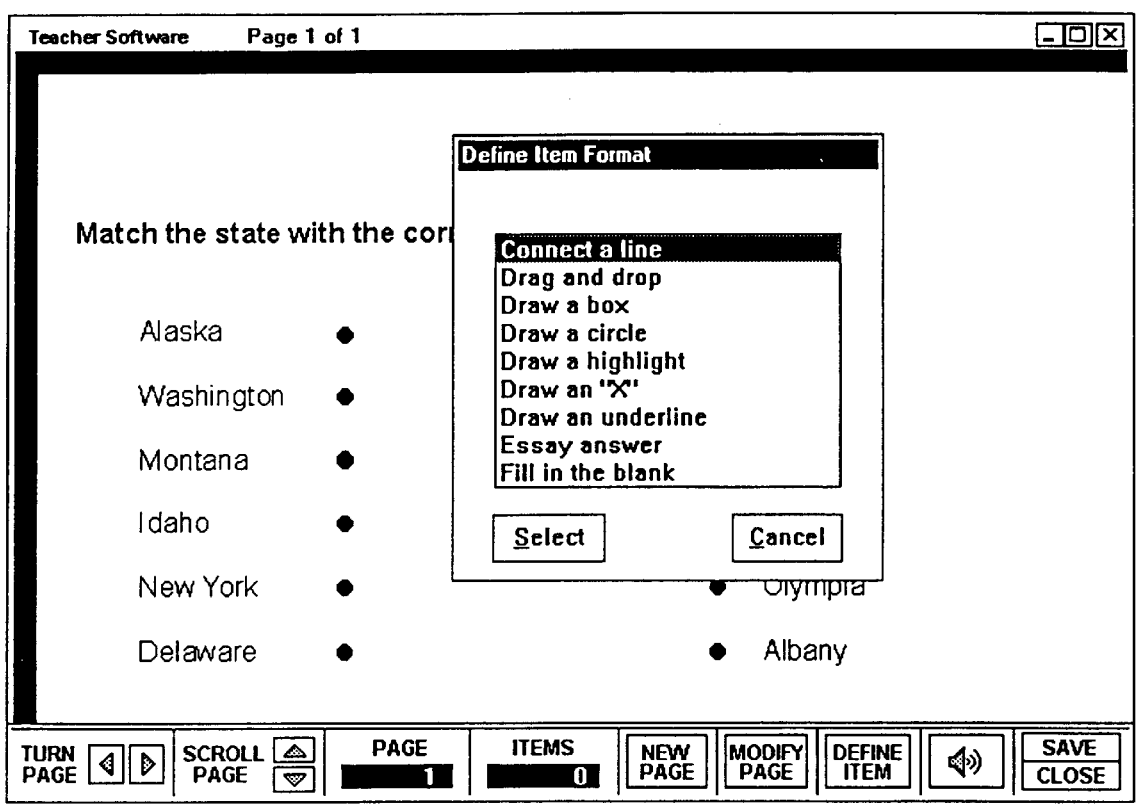

In order to apply an answer format to the computer readable image displayed on the screen, the user activates the "Define Item" button of the tool bar at the bottom of the screen. FIG. 3 shows the pop-up menu that appears when this button is activated. That pop-up menu contains a plurality of available answer formats which can be applied to the computer readable image displayed on the screen. For FIGS. 4–6, it has been assumed that the user (teacher) has selected the "connect a line" format from this list of available formats. FIGS. 11–18, discussed below, illustrate the application of the remaining formats of FIG. 3 to a test directed to a student's knowledge of state capitals (FIGS. 11–16 and 18) or a test of a student's knowledge of United States history (FIG. 17).

Figure 4:
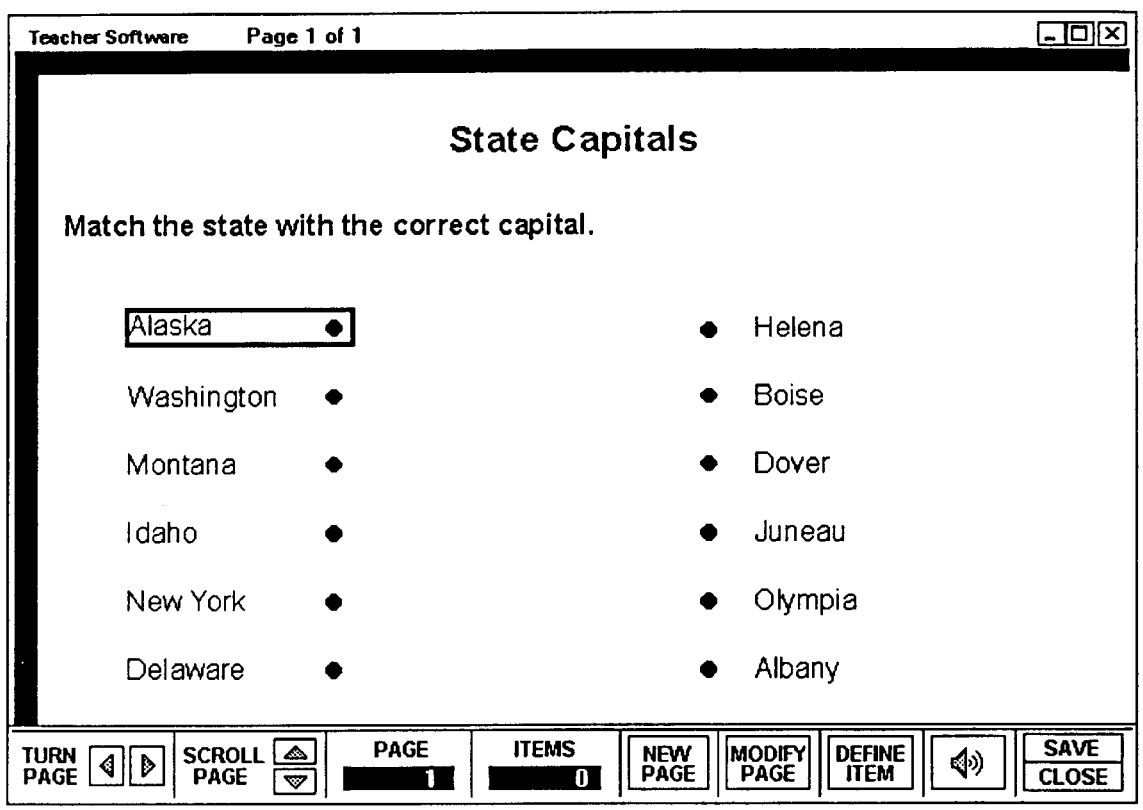
Figure 5:
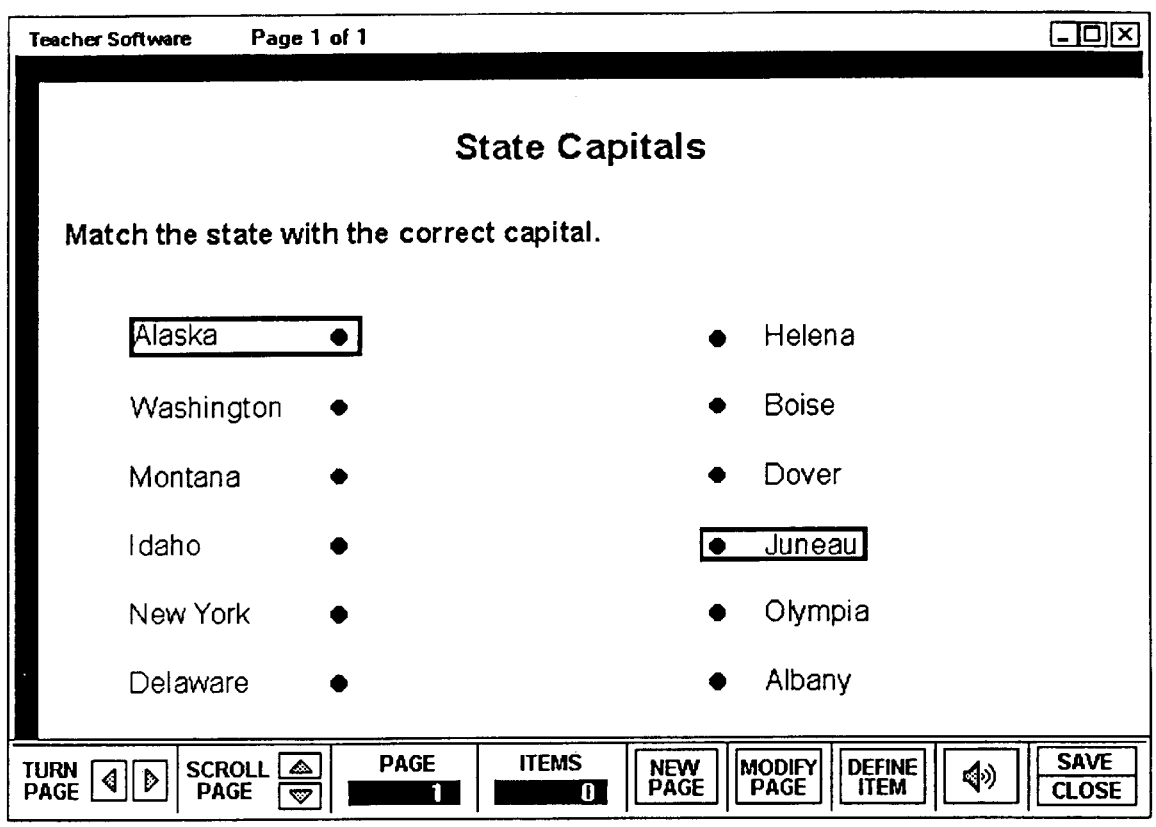
Figure 6:
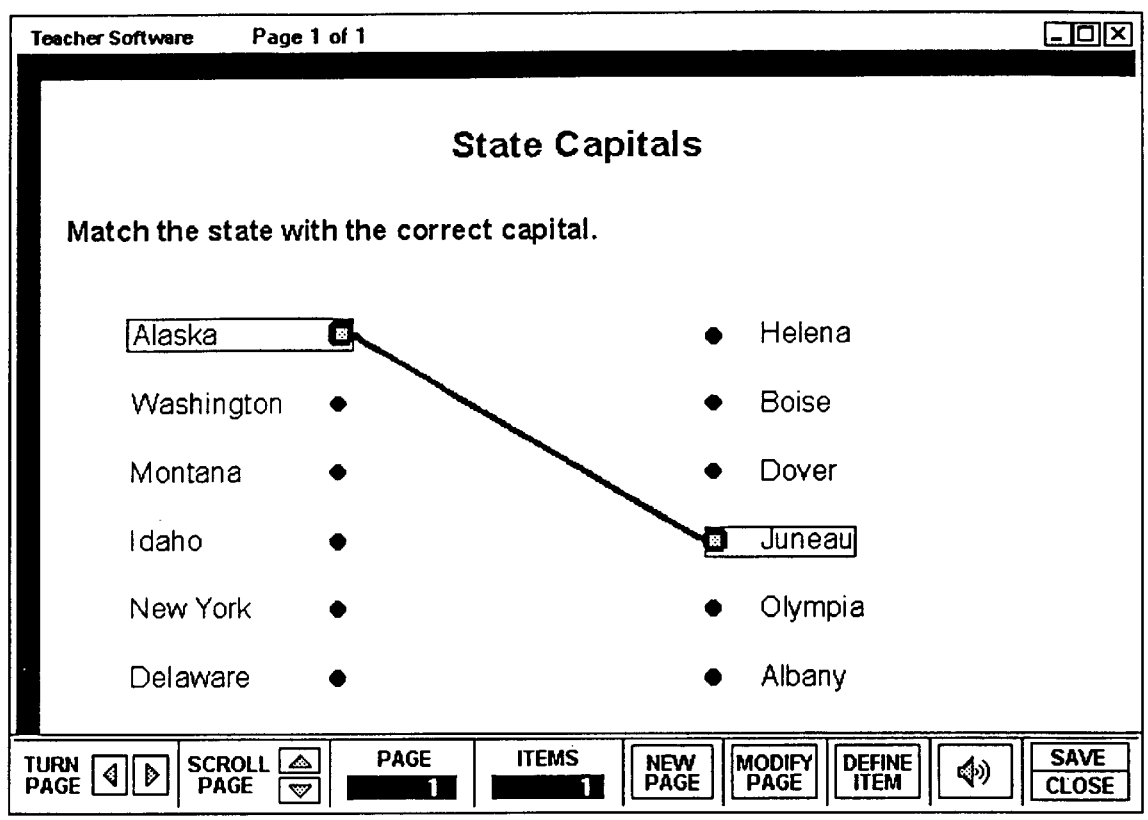

FIGS. 4–6 illustrate the process by which the user (teacher) applies the chosen answer format to the computer readable image so as to modify that image. In particular, in FIG. 4, the user selects an item from the left hand column (e.g., the state of Alaska) using a pointing device, e.g., a mouse. More specifically, the user "boxes" the chosen item by moving the pointing device around that item. Next, as shown in FIG. 5, the user selects the correct answer for the chosen item of the left hand column from the right hand column (e.g., Juneau), again by boxing that item using a pointing device. Once the two boxes are complete, a line between those boxes is automatically applied to the image on the screen by "clicking" the pointing device within the space defined by either of the boxes. This step completes the interaction of the user with the image on the screen for this item. See FIG. 6.

Figure 7:
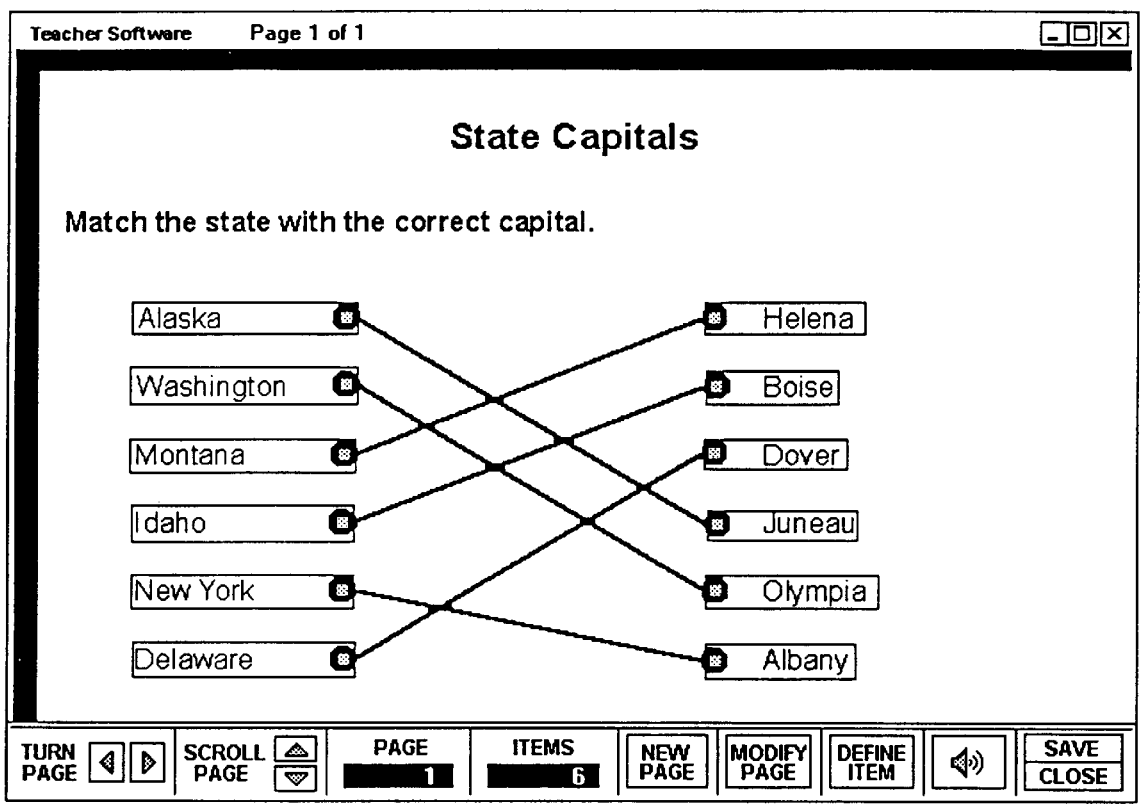

The same process is repeated for each of the other items in the left hand column, the final result being shown in FIG. 7, where each state and each state capital has been boxed and the correct combinations have been connected by lines. FIG. 7 thus shows the final modified computer readable image obtained from the original computer readable image shown in FIG. 2. (Note that modifications to the identification of correct answers can be made at any point in the process by reversing the procedure by which the existing correct answer was created.)

The modified computer readable image can be stored in the user's computer system in various ways. A preferred storage strategy comprises storing the computer readable image of the raw instructional material in its original form, e.g., as a Metafile, as one record of a file and storing the answer format type and the screen coordinates of the specific graphical icons and correct answers applied by the user (e.g., the boxes and lines of FIG. 7) as a separate overlay record in the same file. The combination of these two records then constitutes the modified computer readable image.

When the modified computer readable image is subsequently presented to a user, this separate overlay record is accessed in tandem with the record containing the computer readable image of the raw instructional material. The user at this point can be either a teacher or a student. The images provided to the teacher and the student will, in general, be different, the teacher being shown the modified computer readable image with all the correct answers, and the student being shown only the questions. Accordingly, different portions of the separate overlay record are used depending upon the particular version of the image, e.g., a teacher image versus a student image, which is being displayed.

The use of a separate overlay record in the storage of the modified computer readable image has a number of advantages. For example, this strategy reduces storage requirements since only a relatively small record is needed to store the answer format type and the screen coordinates of the specific graphical icons and correct answers applied by the user in creating the modified computer readable image. Along these same lines, the use of a separate overlay record allows the original image to be presented in different ways to different users (e.g., to the teacher and the student) without the need to store entire copies of those different images in memory. In some cases a teacher may wish to apply different answer formats to different portions of the computer readable image, e.g., the teacher may want the top portion of the image to employ a "connect the line" format while the bottom portion of the image uses a "fill in the blank" format. By using multiple overlay records in the file for the modified computer readable image, such multiple answer formats can be readily accommodated.

In some cases, the user may wish to associate an audio output, a video output, and/or textual material, e.g., an instructional category and/or a scoring weight, with the modified computer readable image or a portion thereof, e.g., with specific questions and answers. A convenient way of providing this option is through double clicking of the left button of a conventional mouse when the cursor is within the icon area corresponding to a correct answer. Such double clicking can bring up a pop-up menu (not shown) containing such choices as "multimedia file," "instructional objective code", "scoring weight", etc. The user can then click on one or more of these choices and provide appropriate information which is stored in the overlay record for use in connection with the modified computer readable image. Such a pop-up menu can also conveniently include a "remove" option to eliminate an incorrect answer which may have been written to the overlay record. FIGS. 33–36 illustrate the steps involved in implementing these options.

Figure 35:
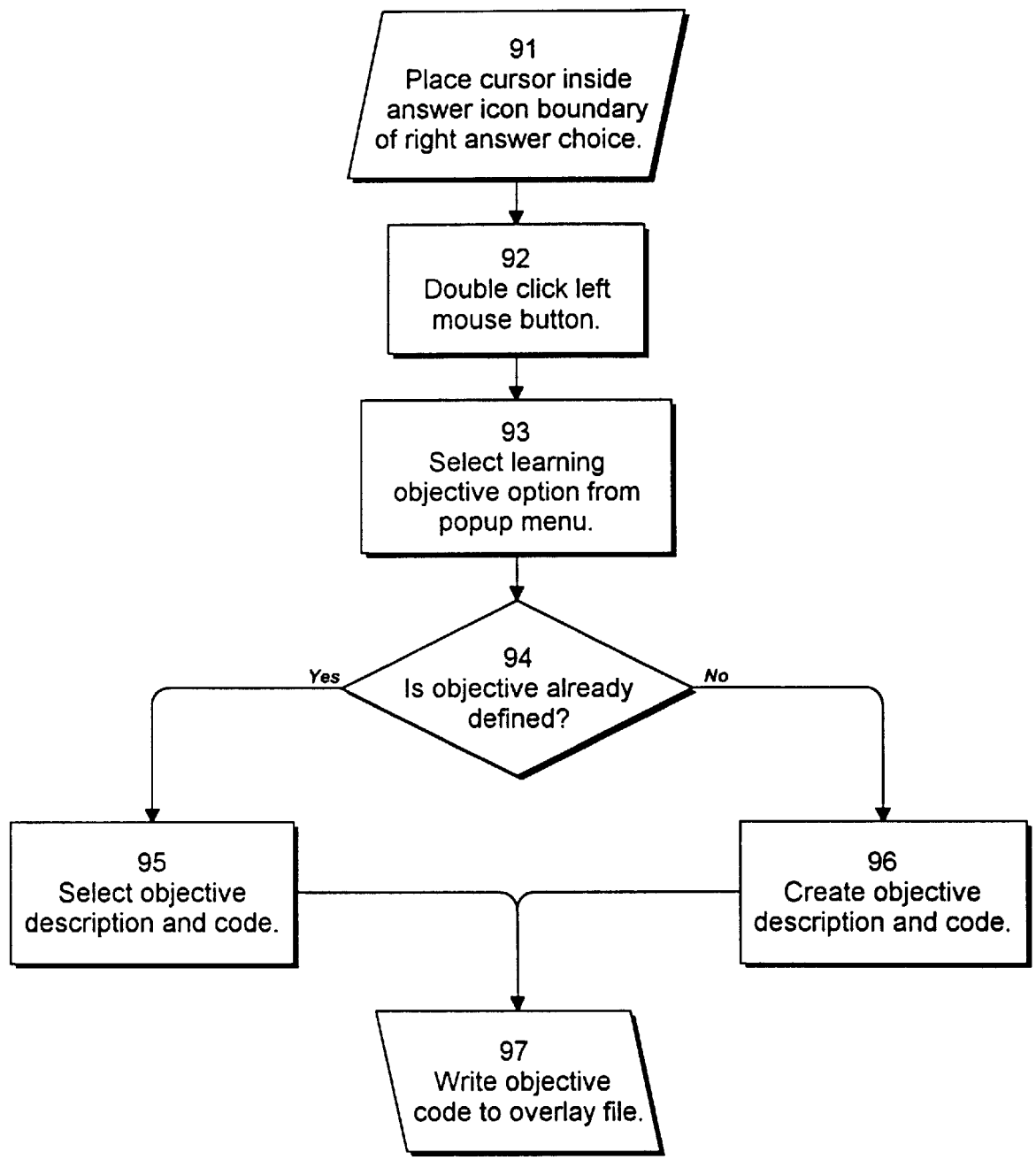
Figure 36:
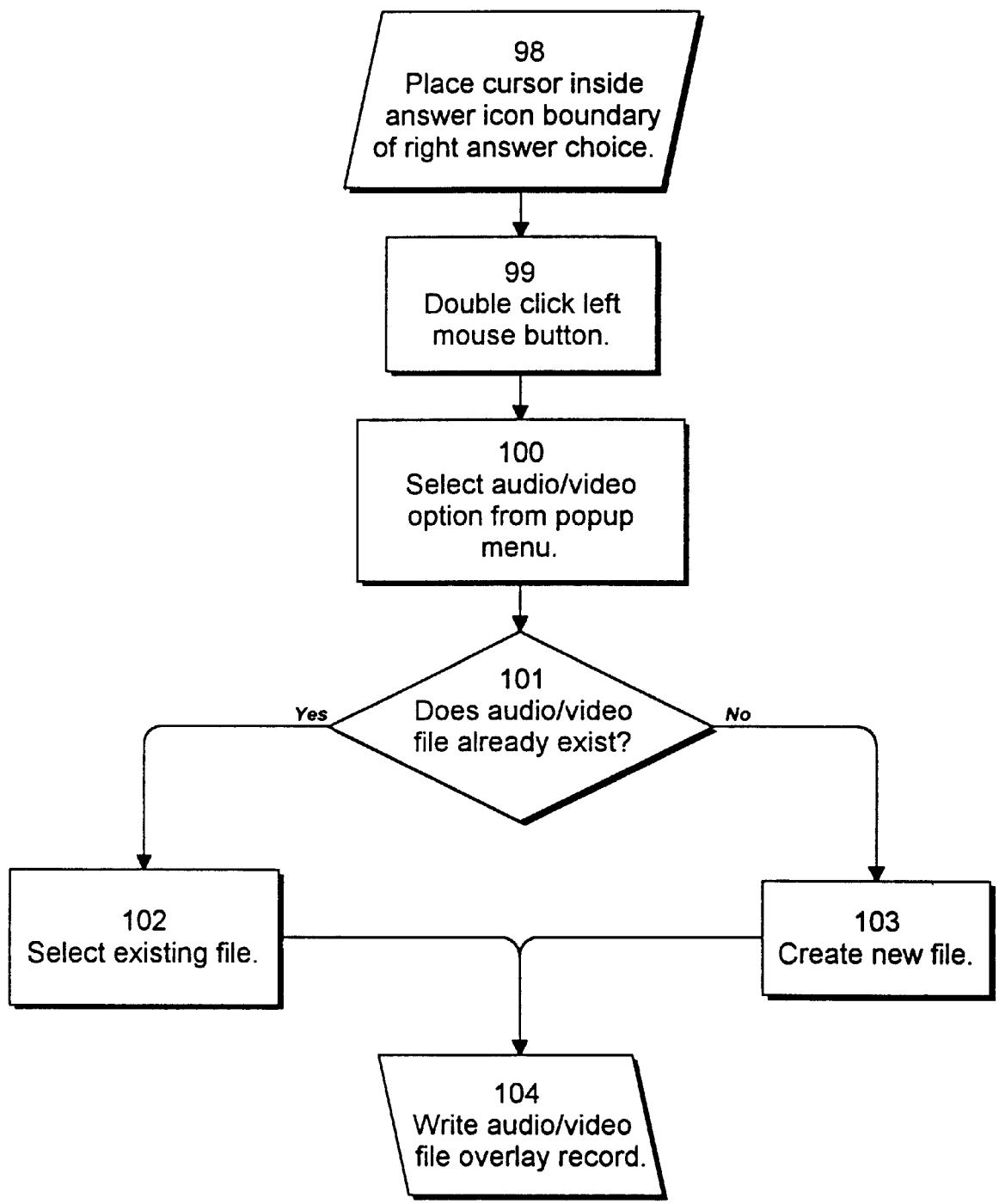

With regard to FIG. 35, it should be noted that some jurisdictions, e.g., Texas and Florida, have coded curricula. In such cases, the codes assigned by these jurisdictions can be used in the practice of the invention. Specifically, these codes can be stored in an external file which is accessed as the steps of FIG. 35 are executed. In cases where coding has not previously been performed, an external file which codes the relevant curriculum is prepared and that file is accessed as the steps of FIG. 35 are executed.

Assigning instructional objective codes to questions allows the student's answers to be organized and reported in terms of the student's achievement level in accordance with the applicable curriculum standards in the jurisdiction in which the student is enrolled. If desired, the student's achievement level can be reported in terms of more than one curriculum standard, e.g., based on a state level standard and a local standard. In such case, the student's responses to test question is linked to the different curriculum standards for which a report is to be prepared, e.g., the instructional category codes assigned to the questions are sorted for each curriculum standard for which a report is desired.

Figure 8:
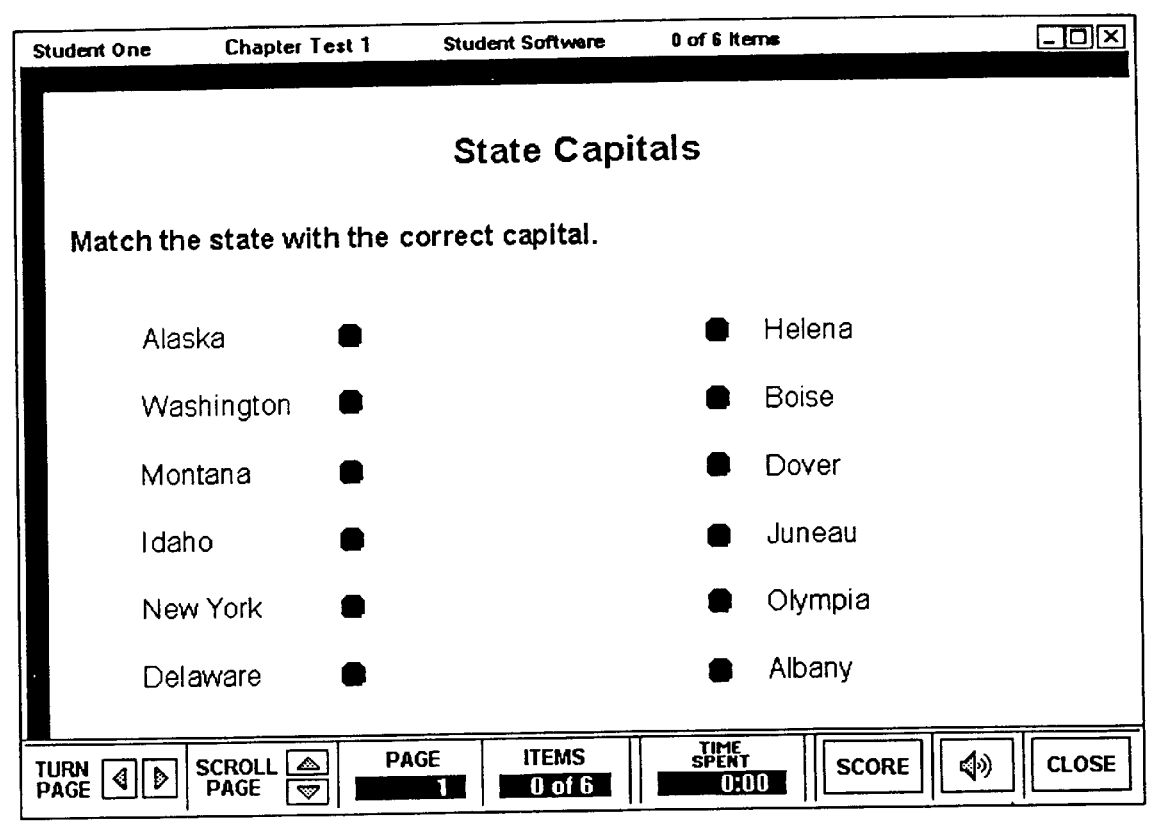
Figure 10:
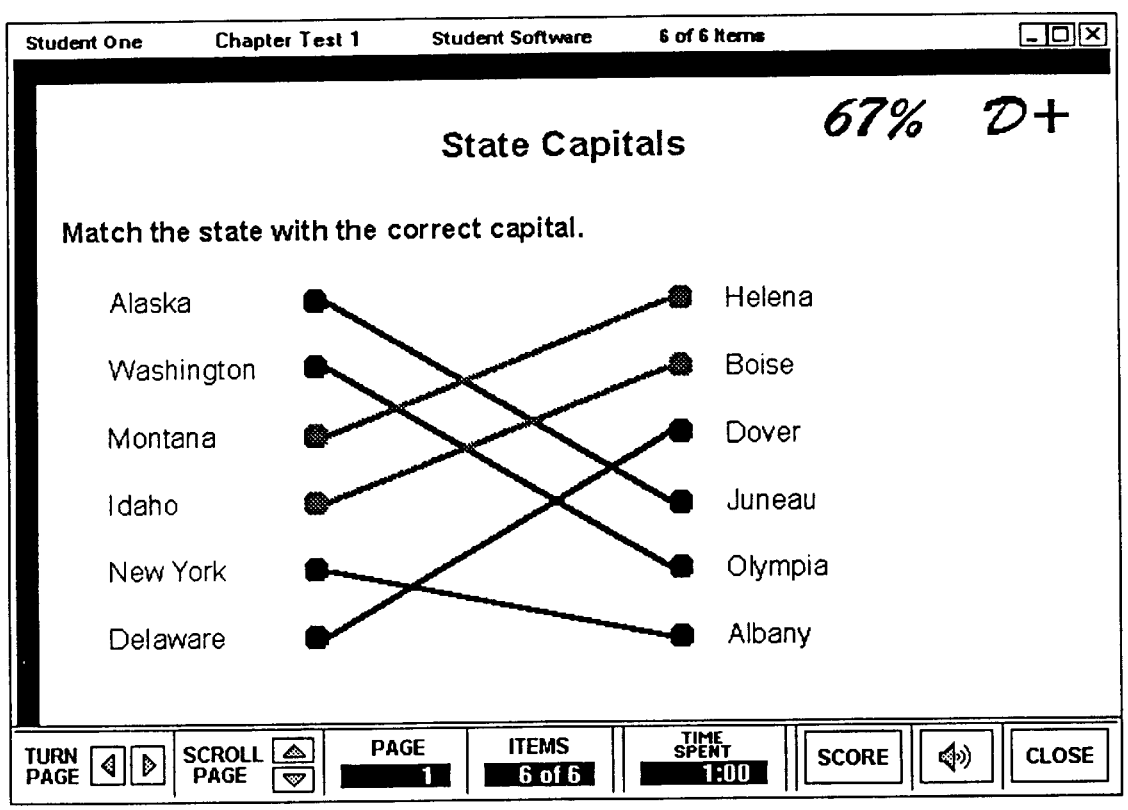

FIGS. 8–10 illustrate the use of the page of the computer readable book created in FIGS. 1–7 by a student.

FIG. 8 shows the initial image presented to the student. The student takes the test of this figure by, for example, clicking the left button of a mouse on one of the states and while holding that button down moving the cursor to the city which the student believes is the state capital of that state. As the mouse moves, a line appears on the screen between the state and the current location of the cursor. When the student arrives at a city and releases the button, the line connects the state to the city and represents the student's answer. The student can change that answer by reclicking on the city and moving the line to another city.

FIG. 9 shows the completed page of the computer readable book, and FIG. 10 shows the automatic grading of the page through the use of the correct answers stored in the file which contains the modified computer readable image. Such grading can be done either by the student immediately after the test has been taken (e.g., by activating the "Score" button of the tool bar at the bottom of the screen), or can be done separately by the teacher. As can be seen in FIG. 9, the student has incorrectly identified the state capitals for Montana and Idaho. In FIG. 10, the correct answers for these states are shown so that the student will understand where he or she has made a error. Preferably, these correct answers are identified by a different colored line than the correct answers which the student provided during testing, e.g., the correct answers provided during grading are shown in red while those which the student provided during testing are shown in black. The student and teacher can see the answers the student gave to any particular question by clicking on any of the graphical icons for that answer, e.g., if the student clicks on Montana, a line will appear showing that the student's answer was Boise or if the student clicks on Helena, a line will appear showing that Helena was identified with Idaho.

If desired, the student's performance on individual tests and/or individual questions can be recorded in files representing individual student progress, class progress, grade progress, school progress, or the like. Reports to students, teachers, parents, and administrators can then be prepared automatically from these records. The recorded responses can also be used to plan lessons for students, including lessons which are automatically designed and interactively administered on-line on a student-by-student basis, i.e., the on-line interactive instructional material provided to each student is based on that student's performance on prior on-line interactive instructional material.

Other approaches for assigning on-line interactive instructional material include allowing the teacher to establish assignment plans for individual students wherein specific pages of one or more on-line interactive computer readable books are assigned to specific students. If desired, time limits for completing such pages can be set and associated with the pages through, for example, the use of an assignment file. Such an assignment file can be updated as the student completes pages of the computer readable book so that the teacher can monitor the student's progress and electronically grade tests which the student may have taken.

FIGS. 11–18 illustrate other answer formats which can be used in the practice of the invention. In each case, the upper portion of the figure shows the fully modified computer readable image (i.e., each upper portion corresponds to FIG. 7 of the "connect the line" example), while the lower portion of the figure shows the modified computer readable image after administration to a student and grading (i.e., each lower portion corresponds to FIG. 10 of the "connect the line" example).

FIG. 11 shows a "drag and drop" answer format in which the student is presented with a collection of possible answers, clicks the mouse on one of those possible answers, drags that answer to a receiving space for the answer, and releases the mouse. If the student wants to change an answer, he or she clicks on the answer in the receiving space and drags that answer to a new receiving space or returns it to the collection of possible answers. During grading, correct answers are provided for all of the receiving spaces with circles being used to indicate which answers the student got wrong. The student and teacher can see the answer provided by the student by clicking within the area defined by the circle.

FIGS. 12–16 show "true and false" formats using various types of markers, i.e., "draw a box", "draw a circle", "draw a highlight", "draw an X", and "draw an underline", respectively. In each case, the student clicks the mouse on what he or she believes is the correct answer and the marker selected by the teacher appears at that selected location. The student can change an answer by clicking on the alternate choice, whereupon the original marker will disappear and be replaced by a marker at the newly selected location. During grading, correct answers are provided for all questions using, for example, a marker of one color, while incorrect answers are shown by a marker of a different color, e.g., black for correct and red for wrong. It should be noted that the approach of FIGS. 12–16 for a "true and false" format also applies to a "multiple choice" format, the only difference being that there are generally more than two choices for a "multiple choice" format.

Figure 17A:
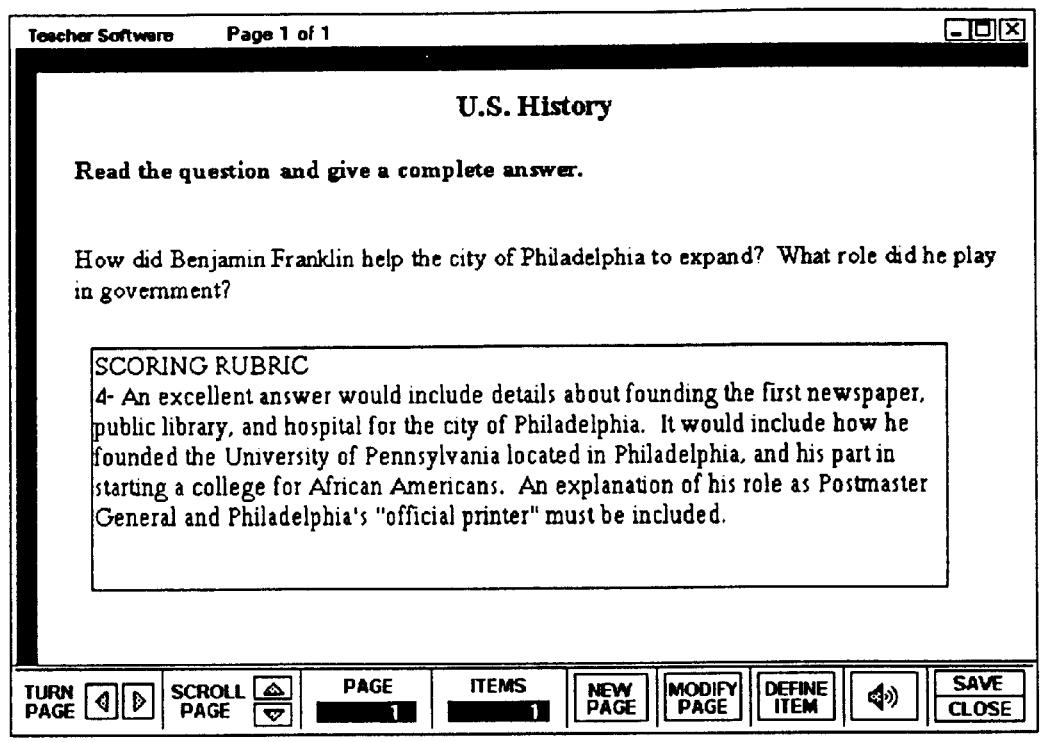
Figure 17B:
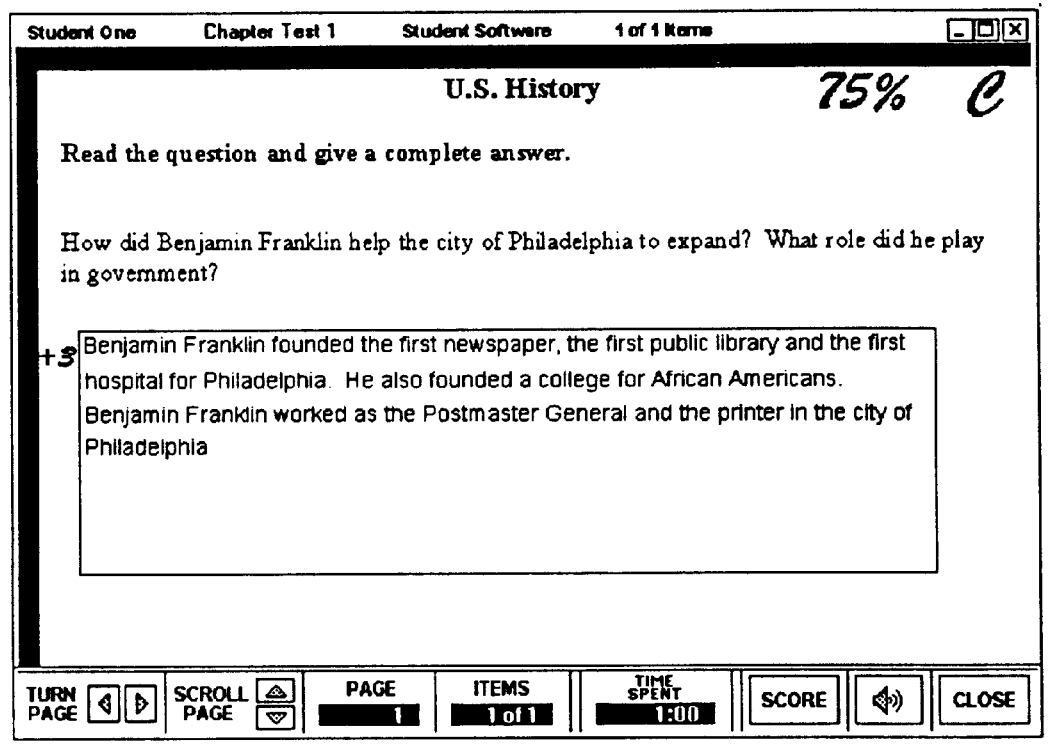

FIG. 17 shows an "essay" format where the student is provided with a region within the modified computer readable image for entering text which is graded by the teacher. As shown in FIG. 17A, the computer readable image preferably includes a model answer provided by the teacher who created that image so that grading can be performed based on a consistent criteria.

FIG. 18 shows a "fill in the blank" format where the student is provided with multiple regions within the modified computer readable image for entering text. Grading of the student's responses is performed by comparing the student's answers with the correct answers provided by the teacher. If desired, somewhat incorrect spellings can be accepted as correct answers, i.e., scoring precision less than 100% can be accepted, the acceptable scoring precession being stored in the overlay record at the time the modified computer readable image is created. The graded tests shows all of the correct answers with the student's wrong answers being circled. The student and teacher can see such wrong answers by clicking in the area defined by such a wrong answer circle.

Figure 19:
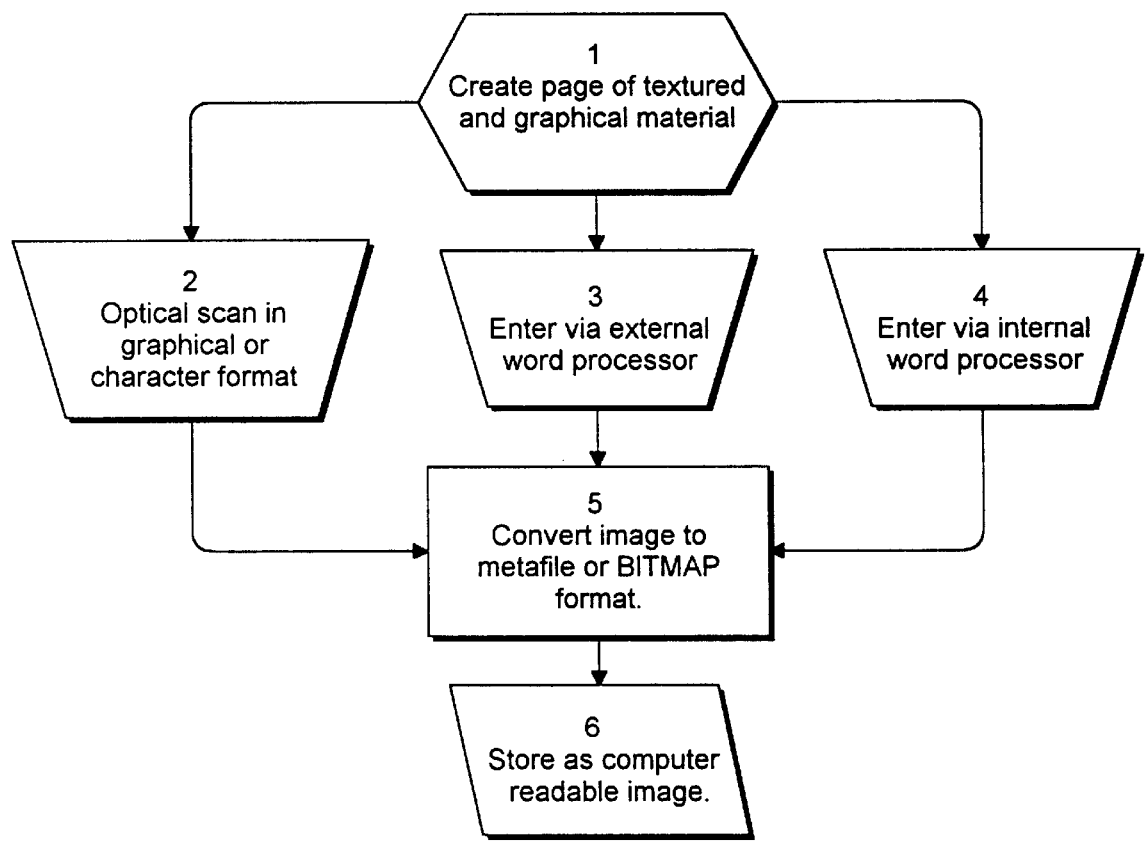

FIGS. 19–24 show flow charts corresponding to FIGS. 1–7. FIG. 19 shows the steps involved in going from the raw instructional material of FIG. 1 to the computer readable image of FIG. 2.

Figure 20:
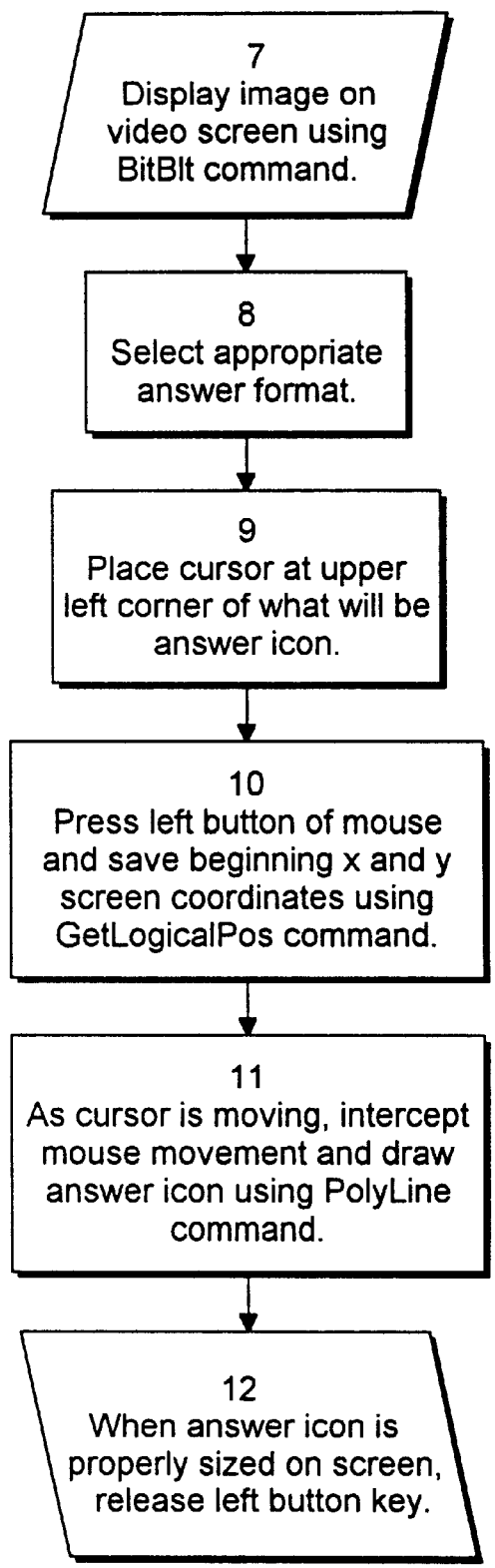
Figure 21:
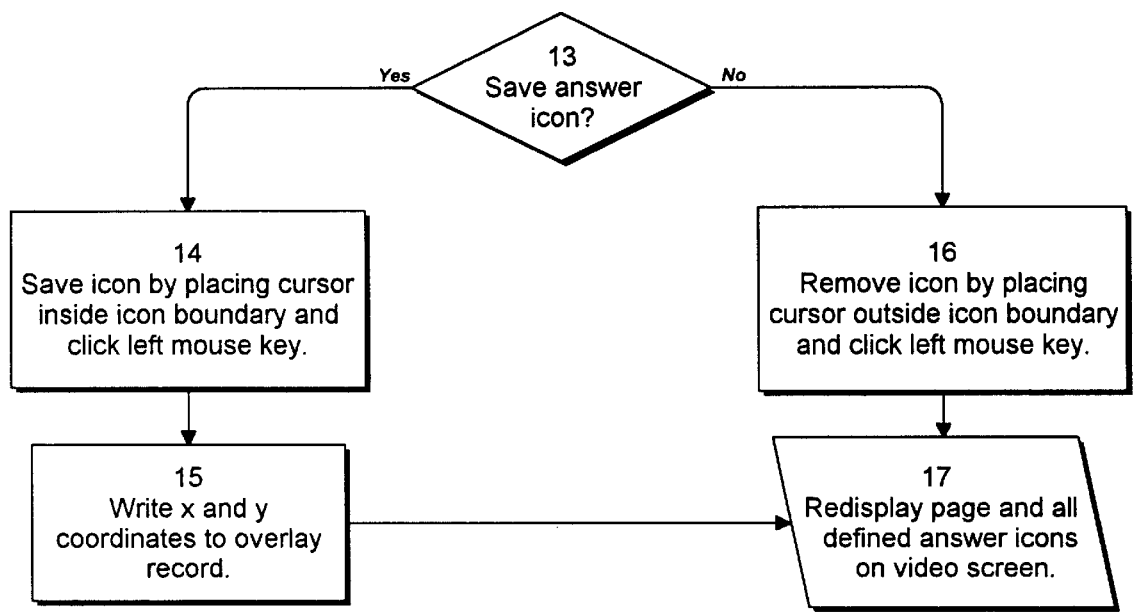
Figure 22:
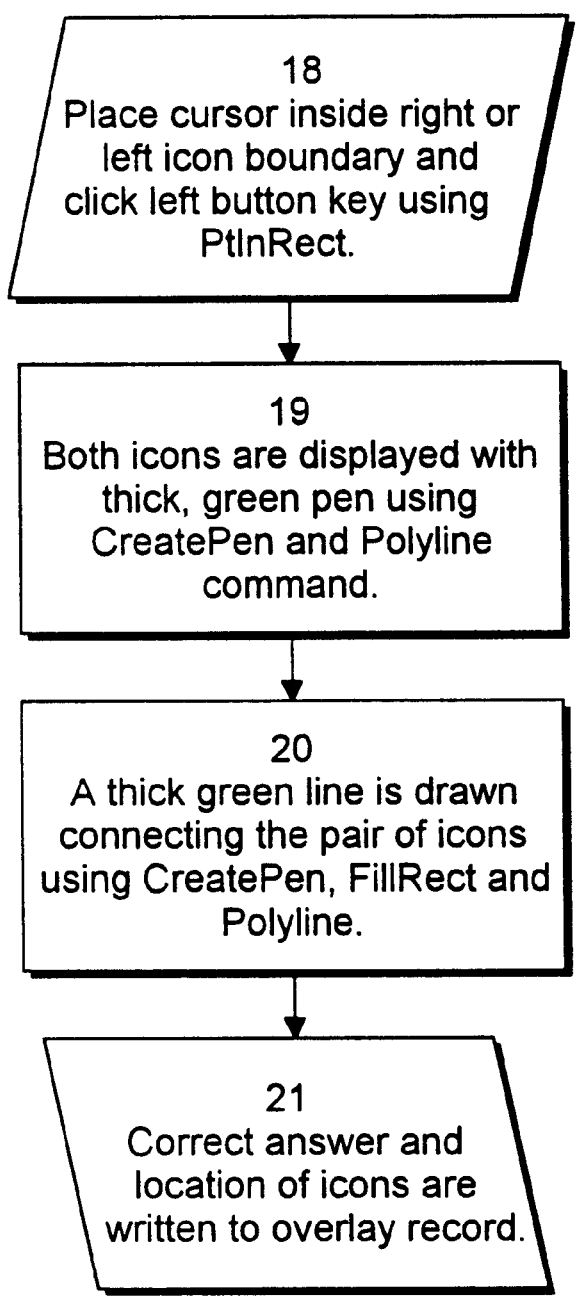

FIGS. 20 and 21 show the steps involved in picking an answer format (e.g., the "connect a line" format; see FIG. 3) and applying an icon of that format to the computer readable image (e.g., applying the boxing icon of the "connect a line" format; see FIG. 4). For the "connect a line" format, steps 9 through 17 of FIGS. 20 and 21 are repeated to produce the right hand boxing icon of FIG. 5. FIG. 22 shows the steps involved in connecting the boxing icons of the "connect a line" format to produce FIG. 6. To produce FIG. 7, steps 9–21 of FIGS. 20–22 are repeated for each of the remaining state/state capital combinations. At this point, as discussed above, the fully modified computer readable image has been created and stored.

Figure 23:
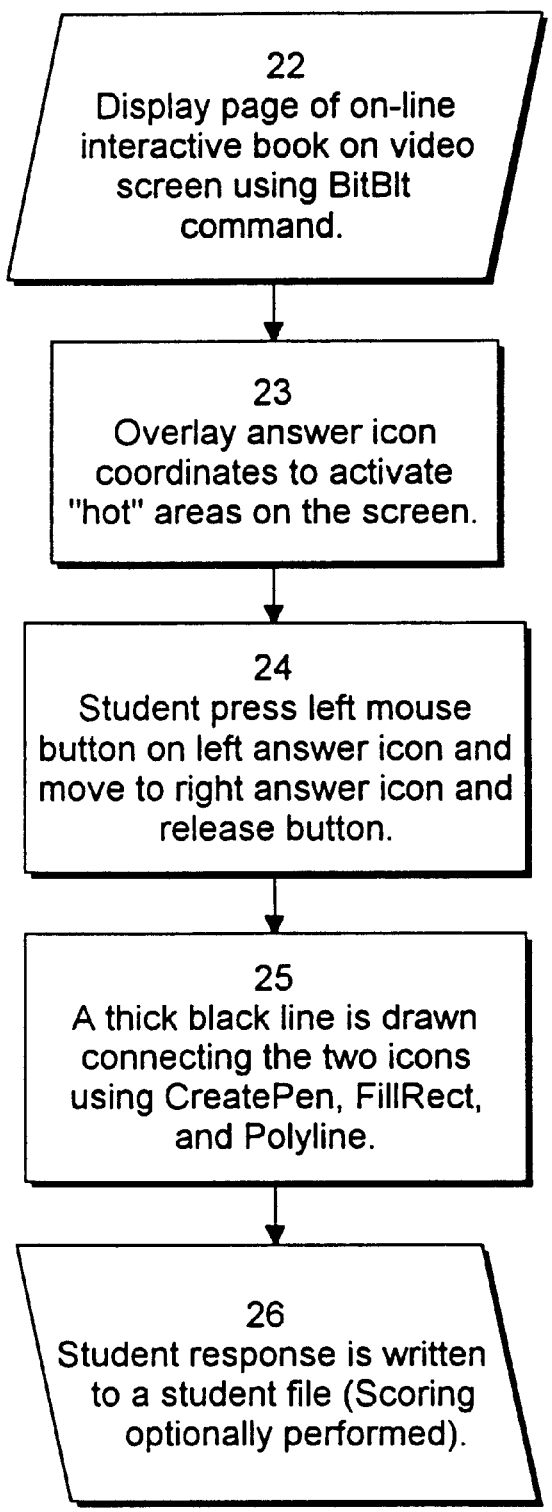
Figure 24:
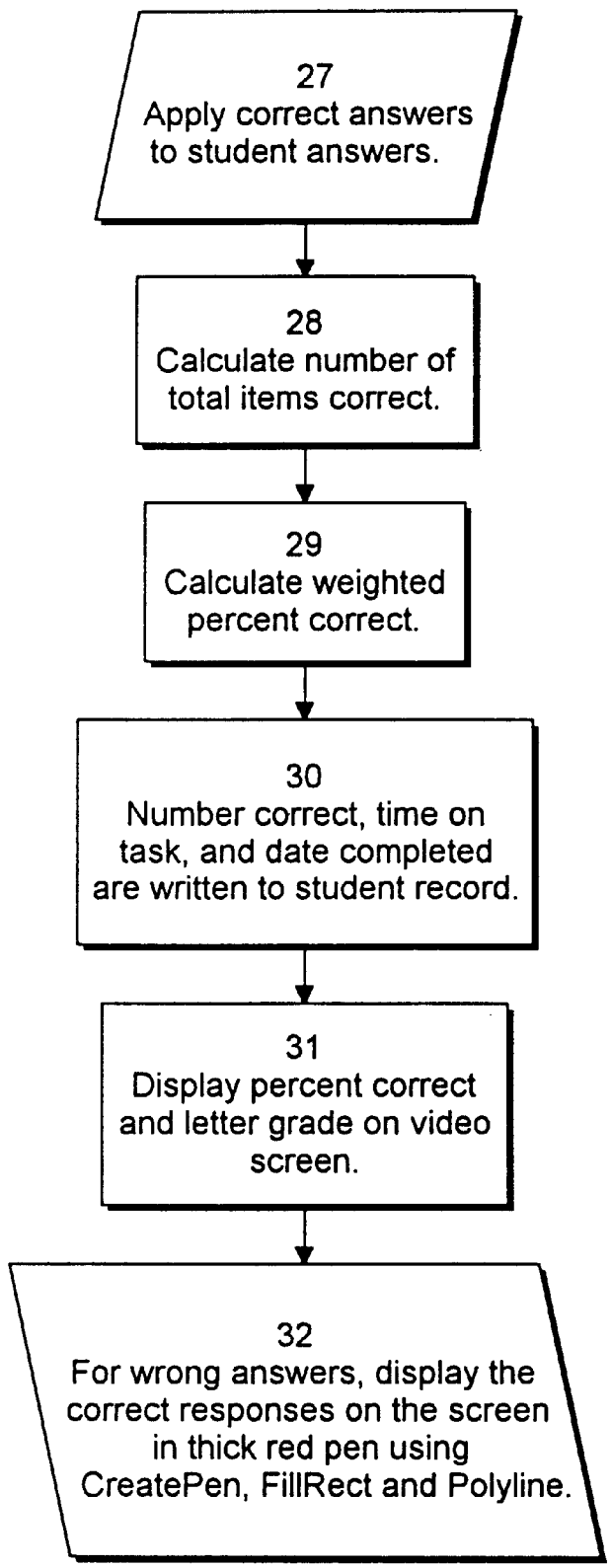

Steps 22–23 of FIG. 23 show the displaying to a student of the student version of the modified computer readable image (see FIG. 8). The "hot" areas referred to in step 23 are those areas which contain an answer icon, the coordinates of which are recorded in the overlay record during the formation of the modified computer readable image. Steps 24–26 of FIG. 23 show the steps involved in the production of FIG. 9, these steps being repeated for each question/answer set. Steps 27–32 of FIG. 24 show the steps involved in the production of FIG. 10, i.e., the grading of the student's test.

Figure 11A:
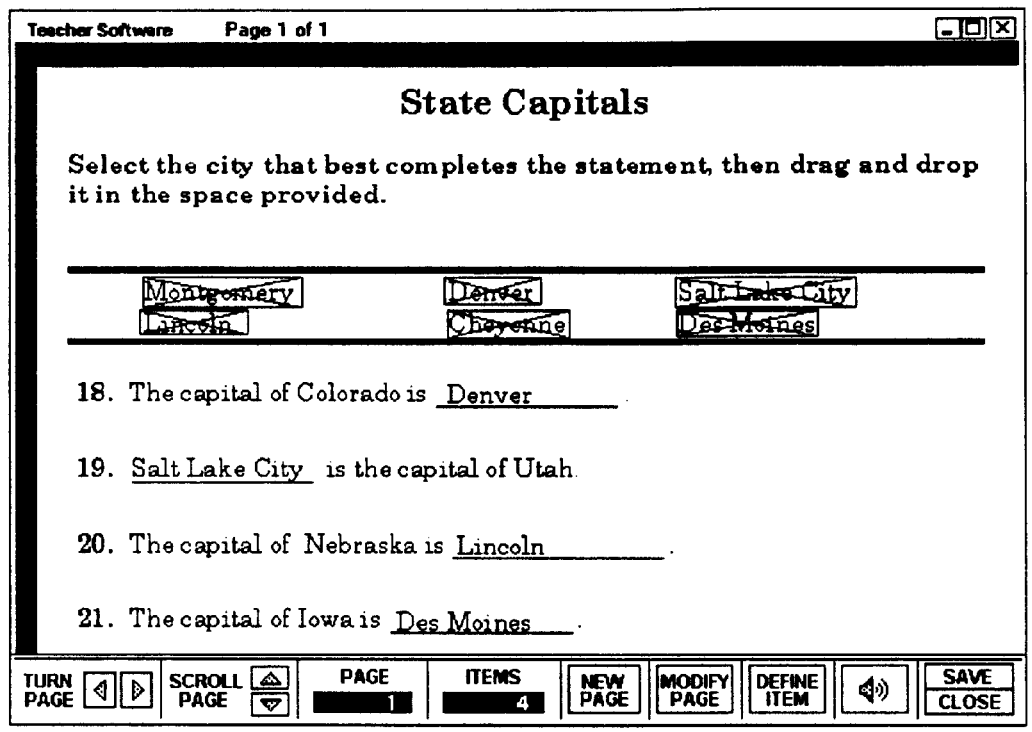
Figure 11B:
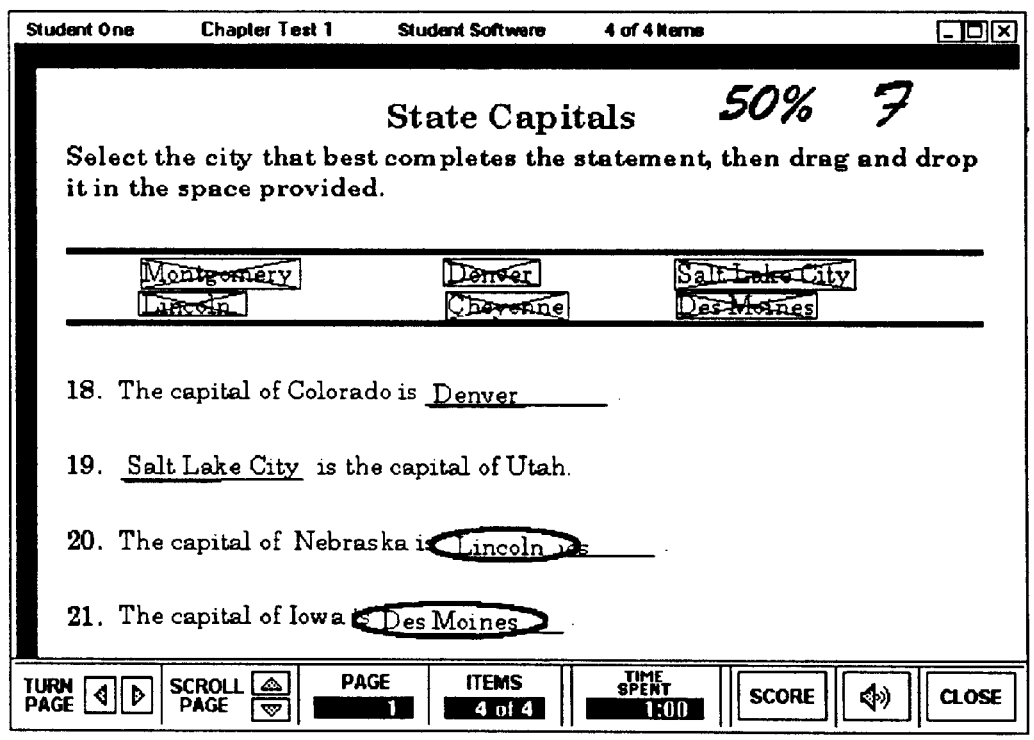
Figure 12A:
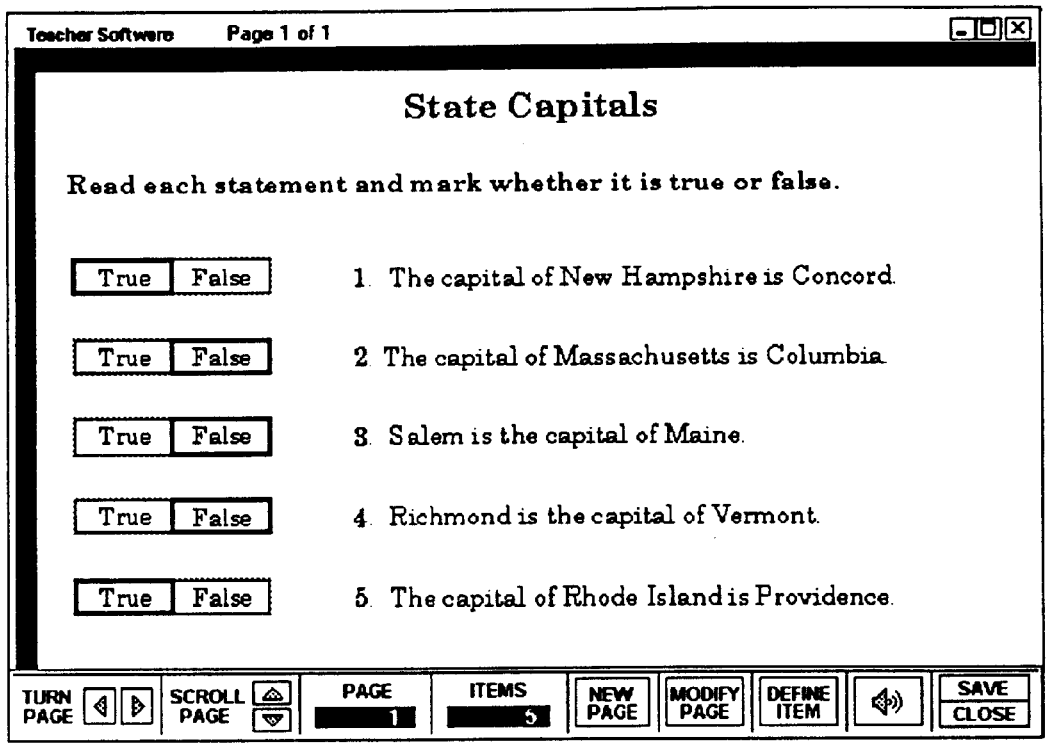
Figure 12B:
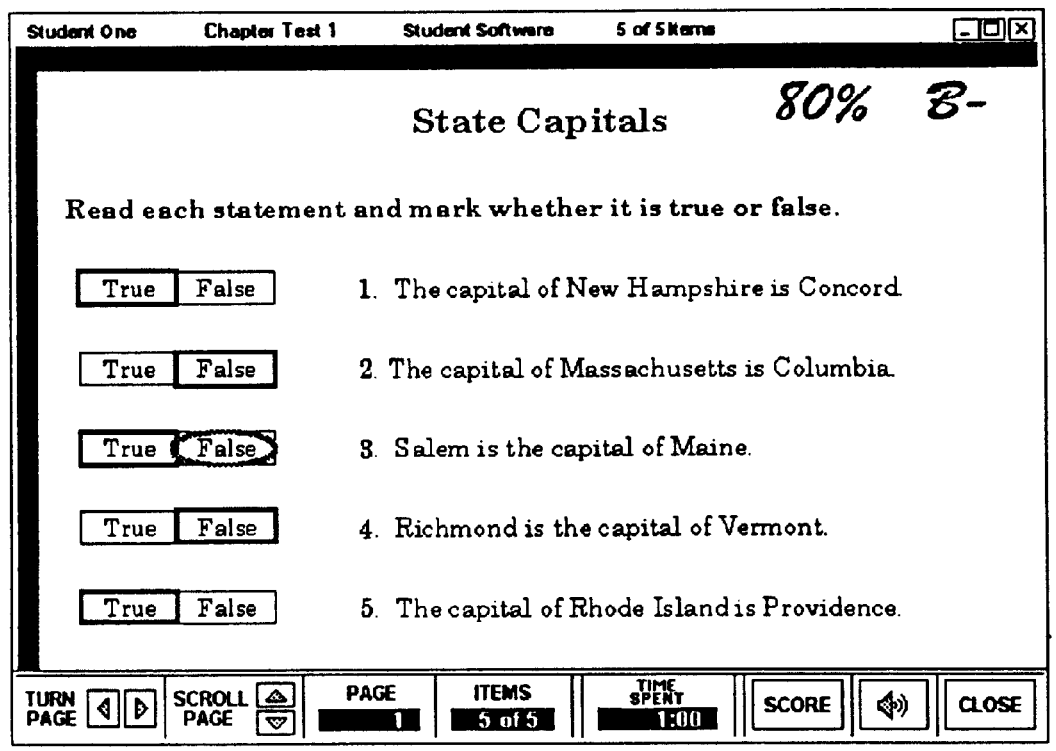
Figure 13A:
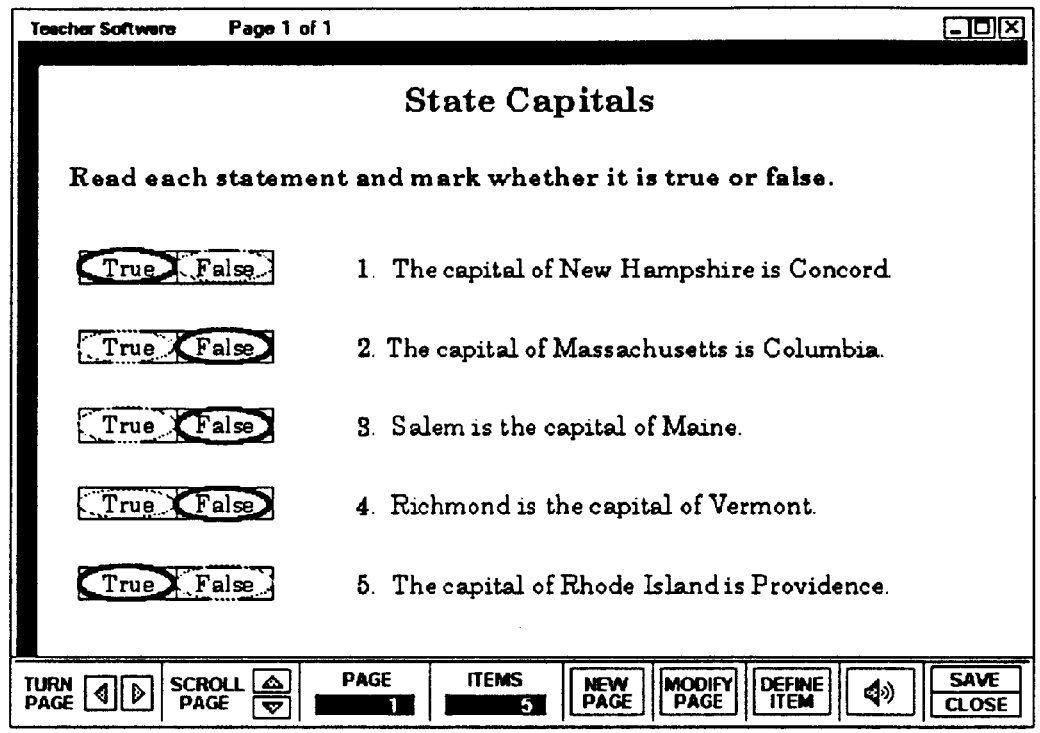
Figure 13B:
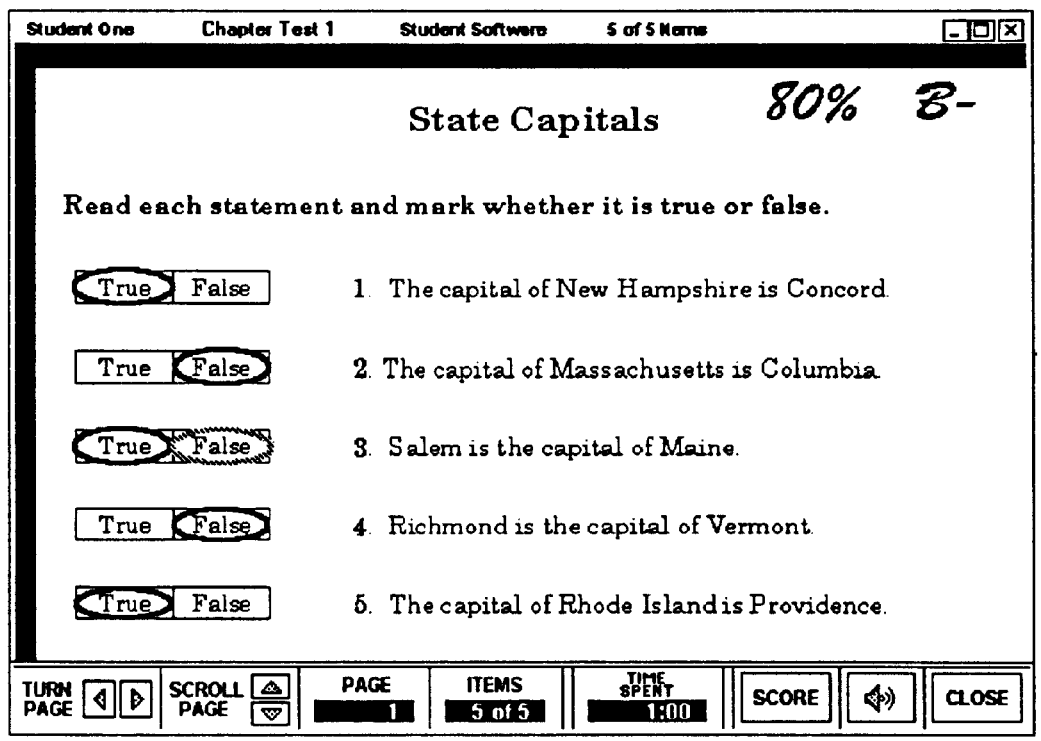
Figure 14A:
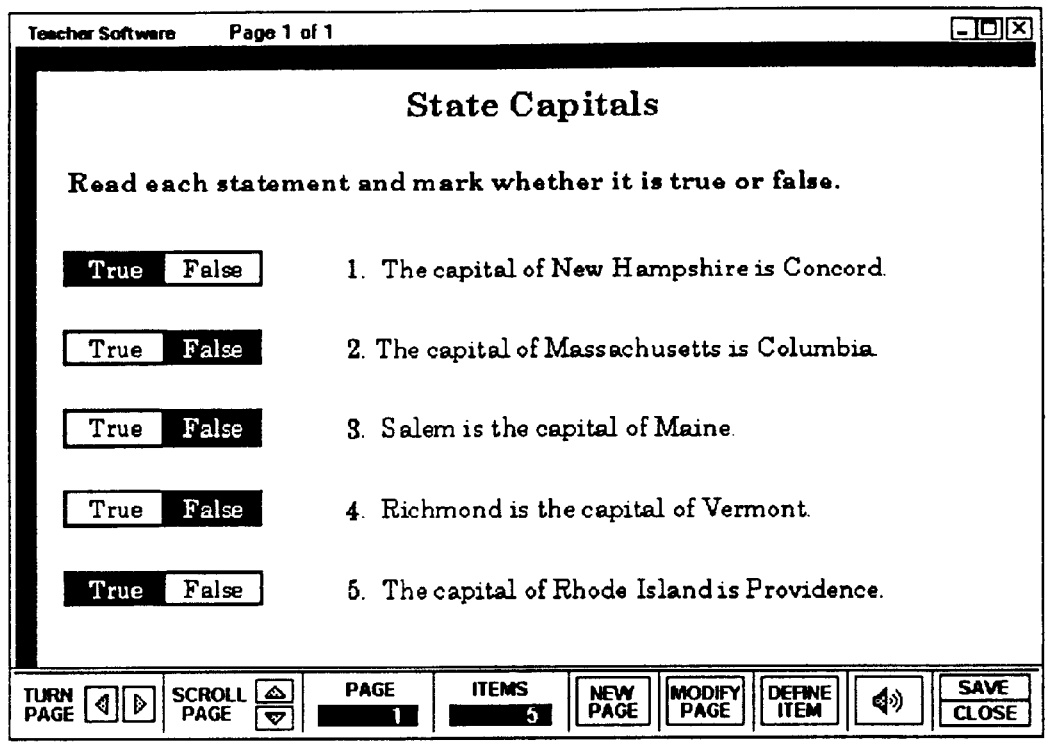
Figure 14B:
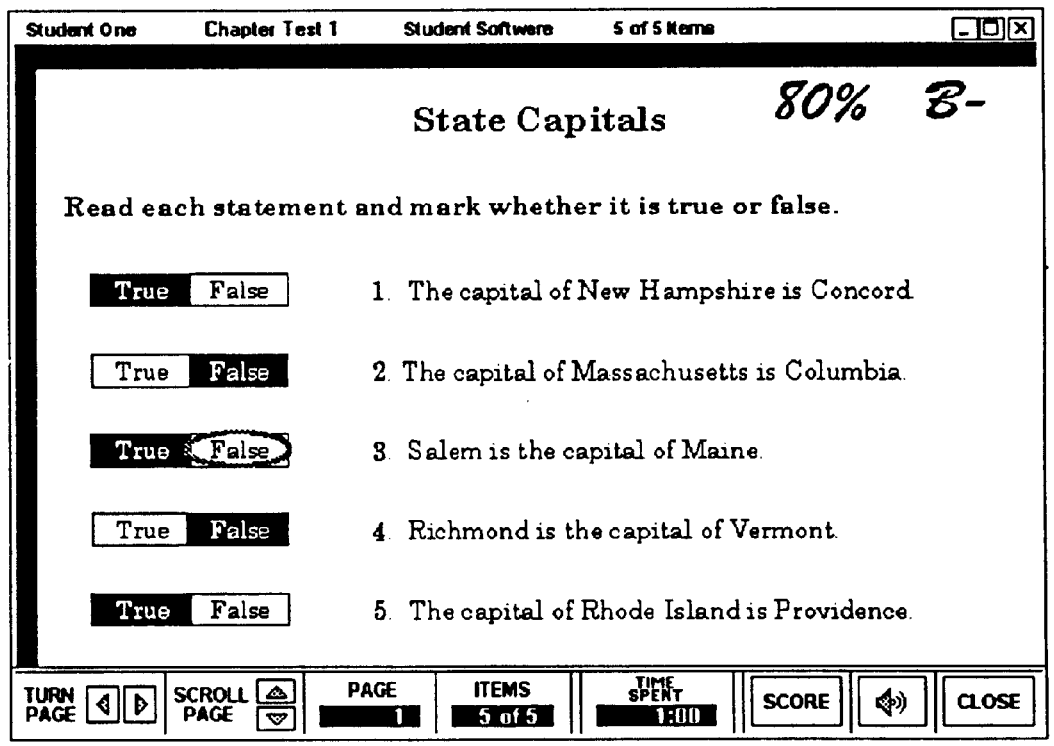
Figure 15A:
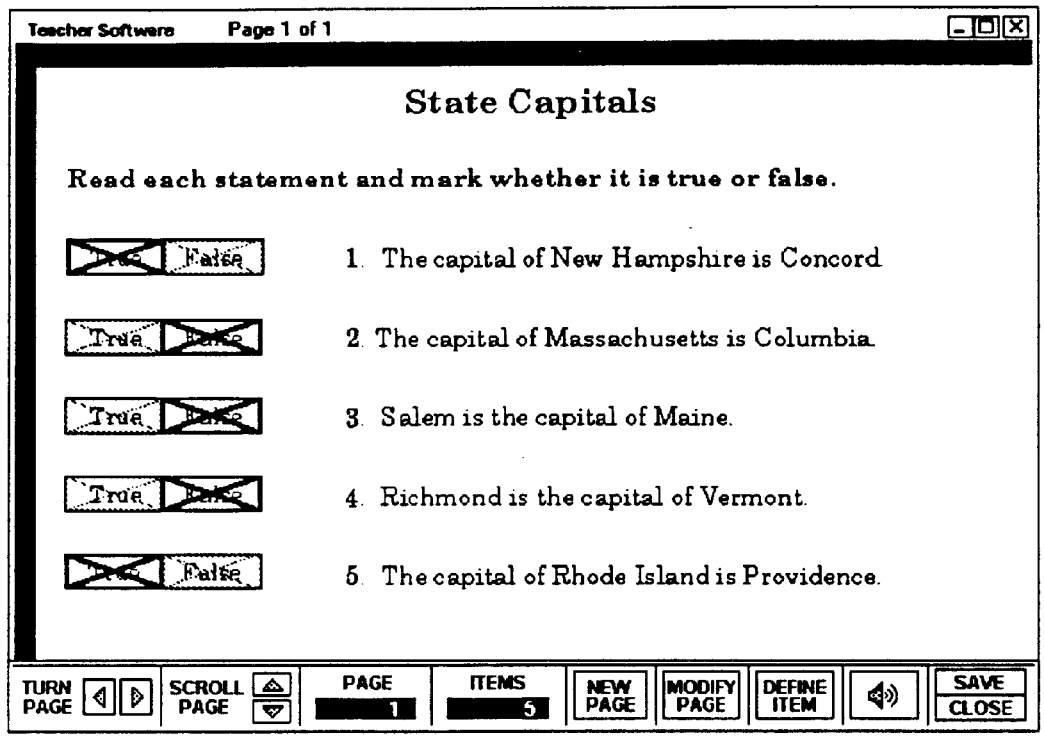
Figure 15B:
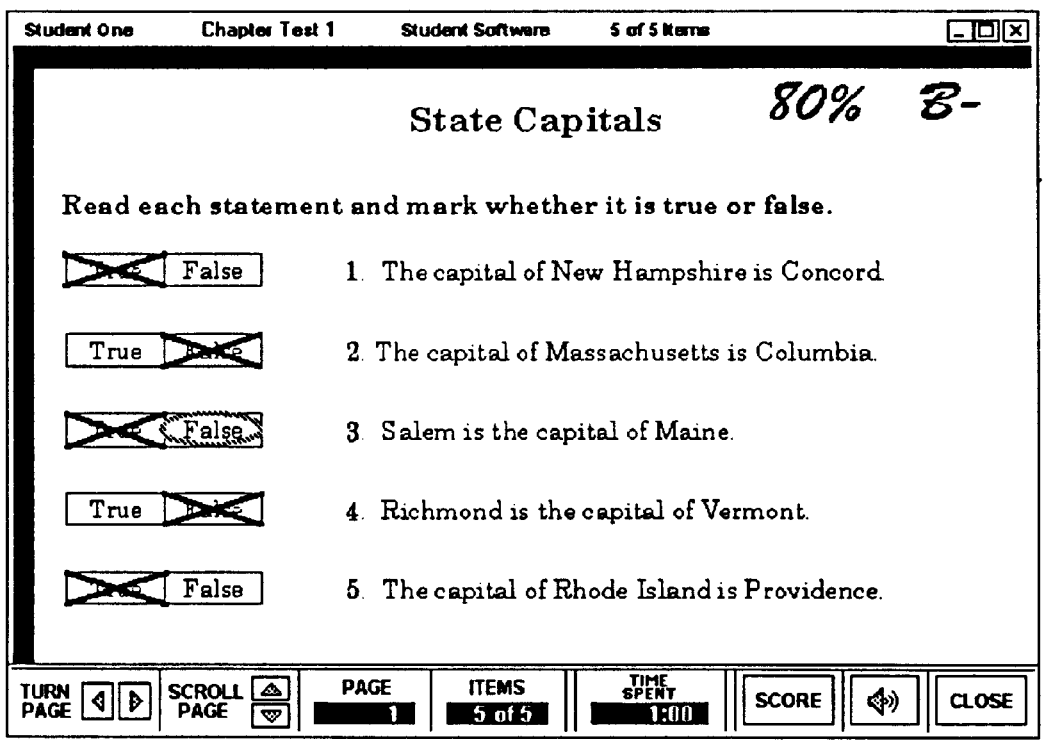
Figure 16A:
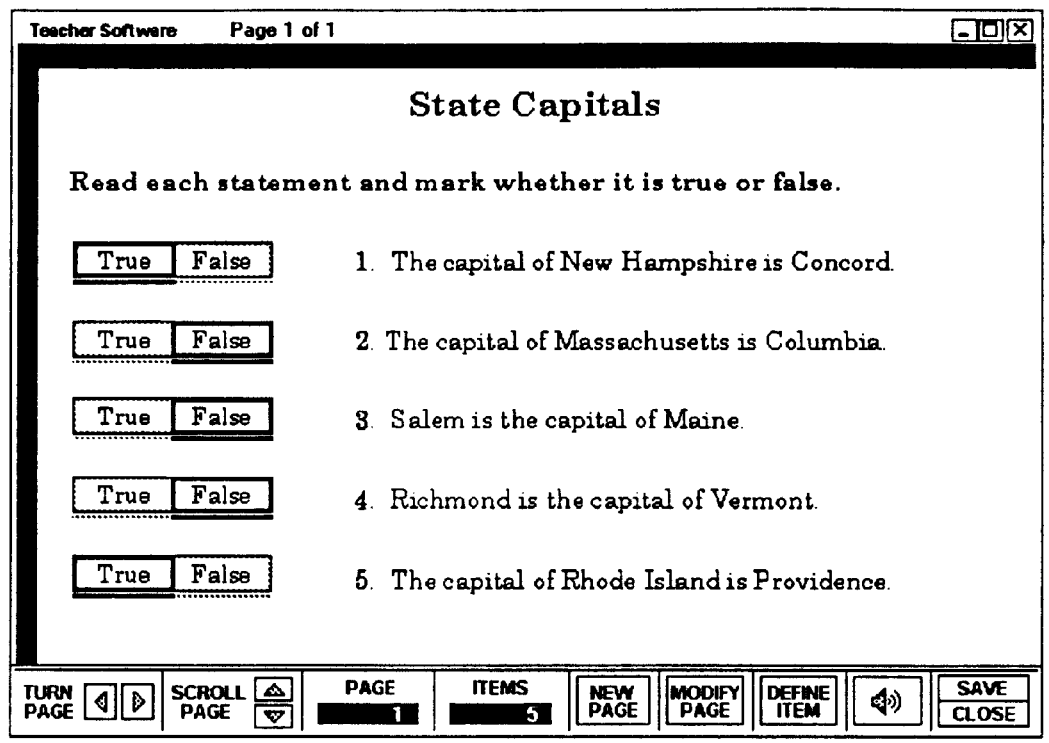
Figure 16B:
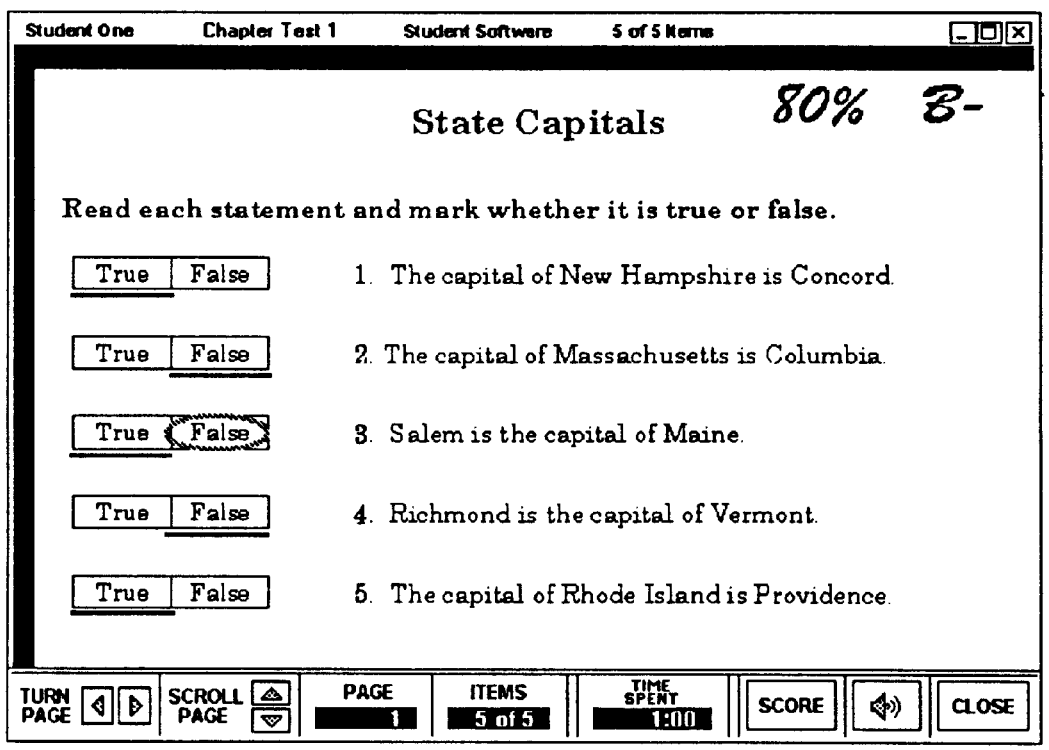
Figure 18A:
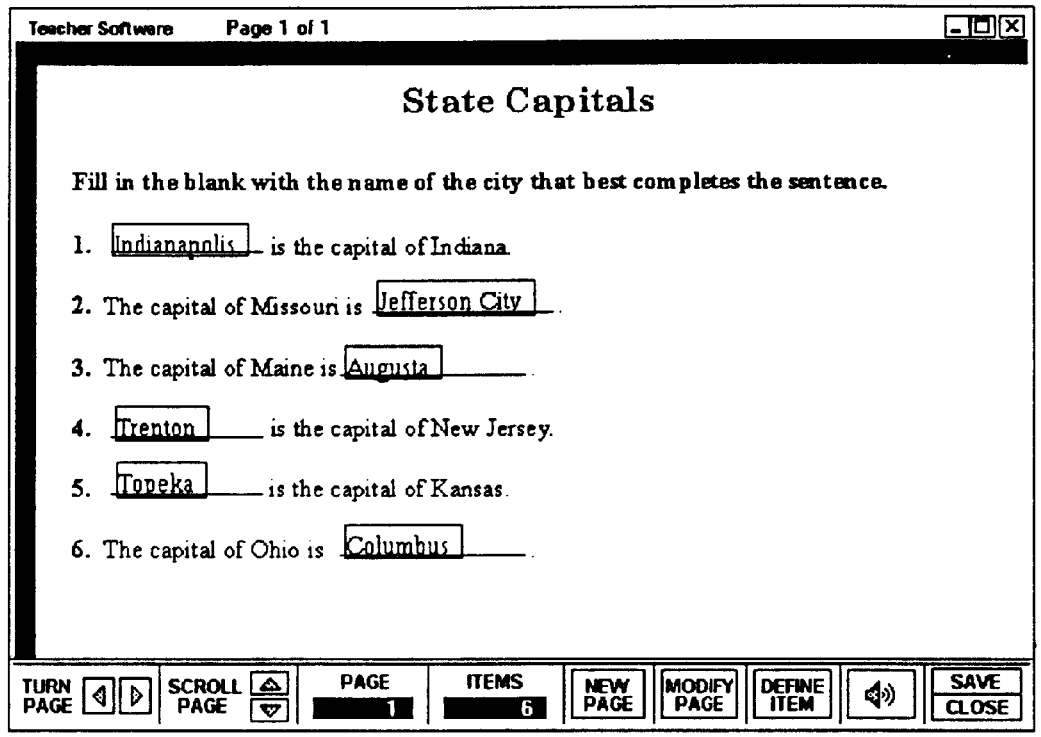
Figure 18B:
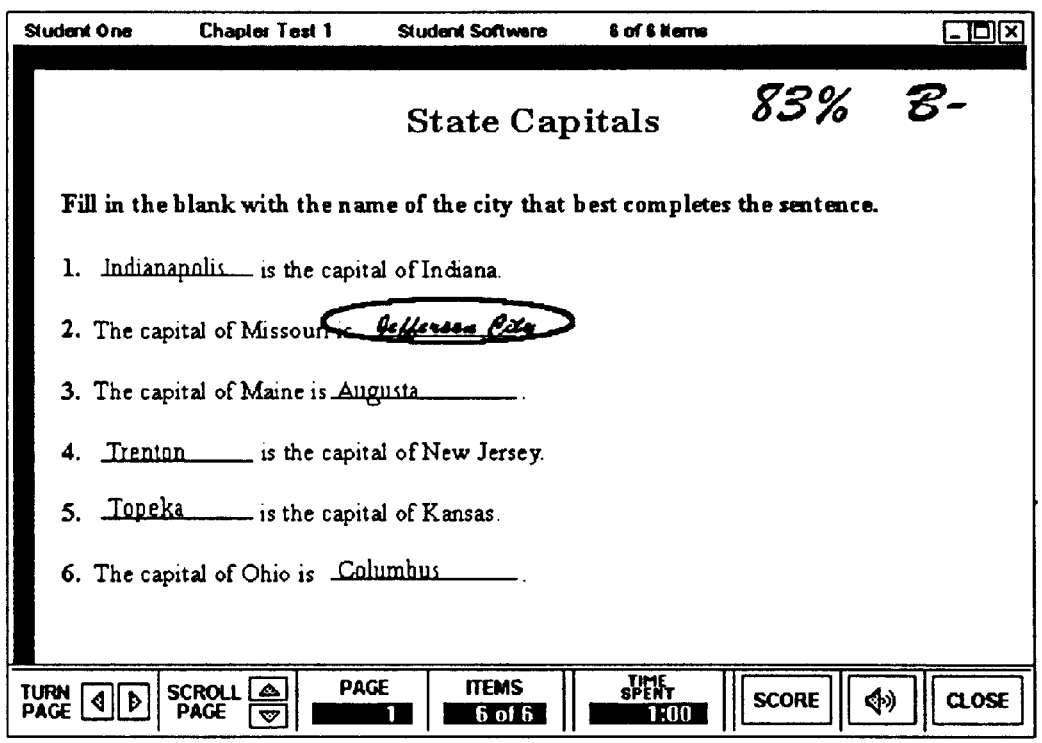
Figure 25:
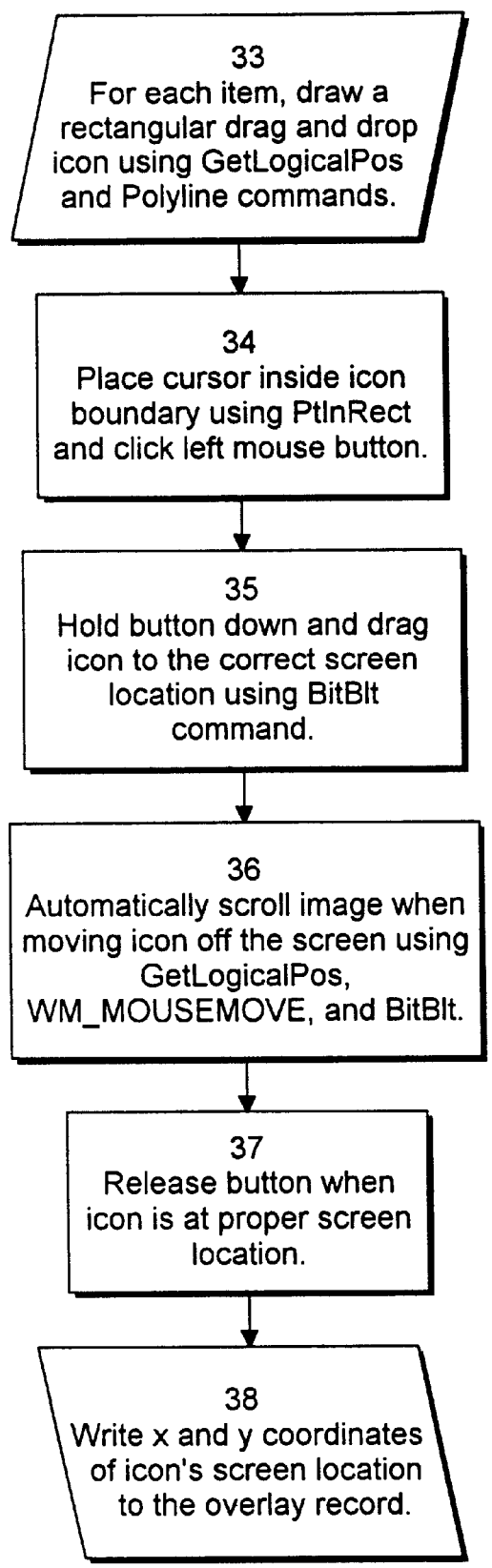
Figure 26:
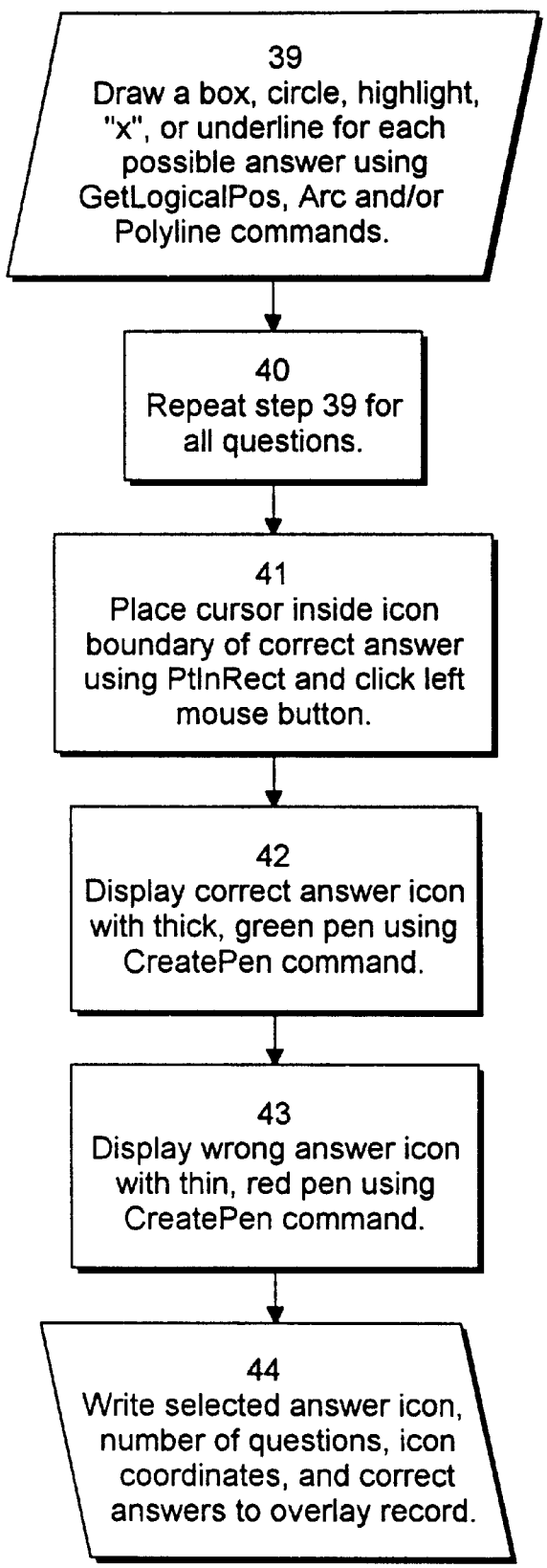
Figure 27:
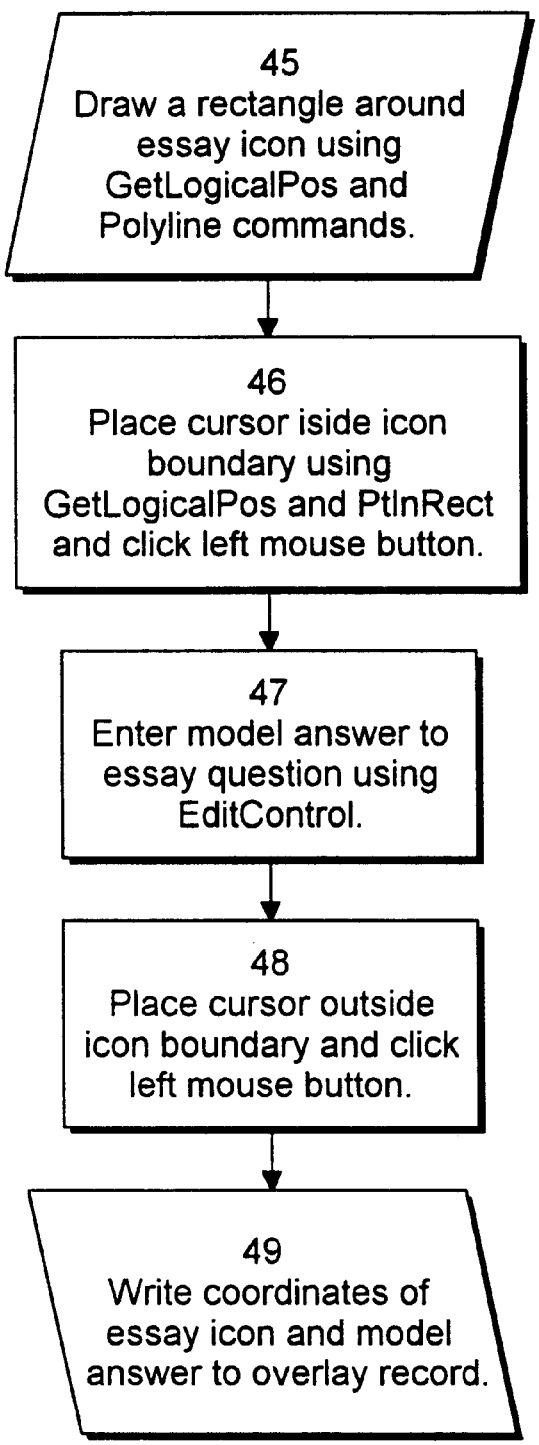
Figure 30:
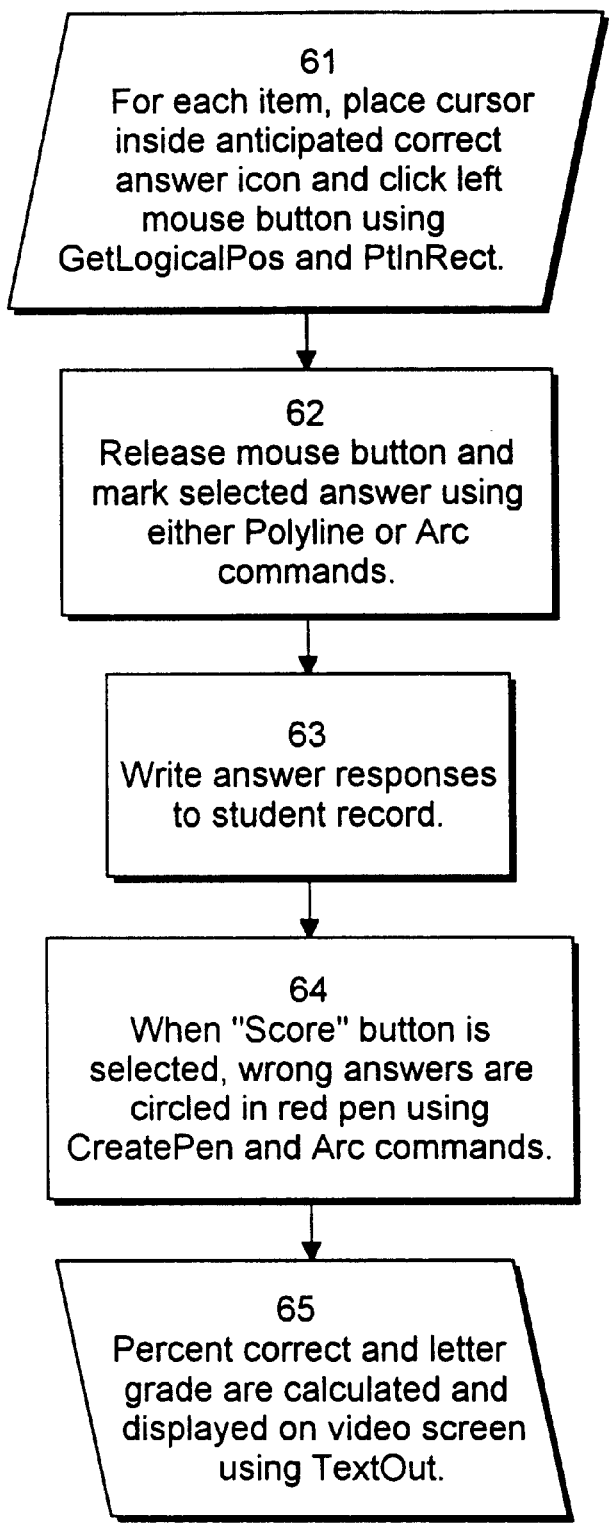
Figure 31:
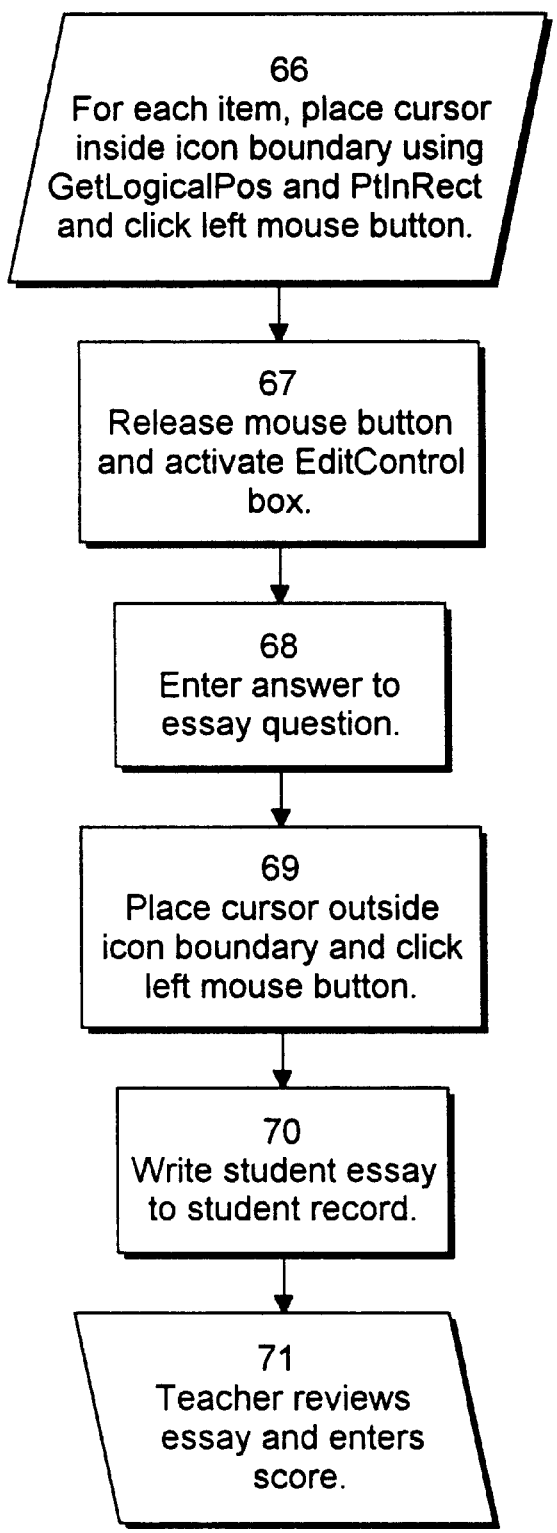
Figure 32:
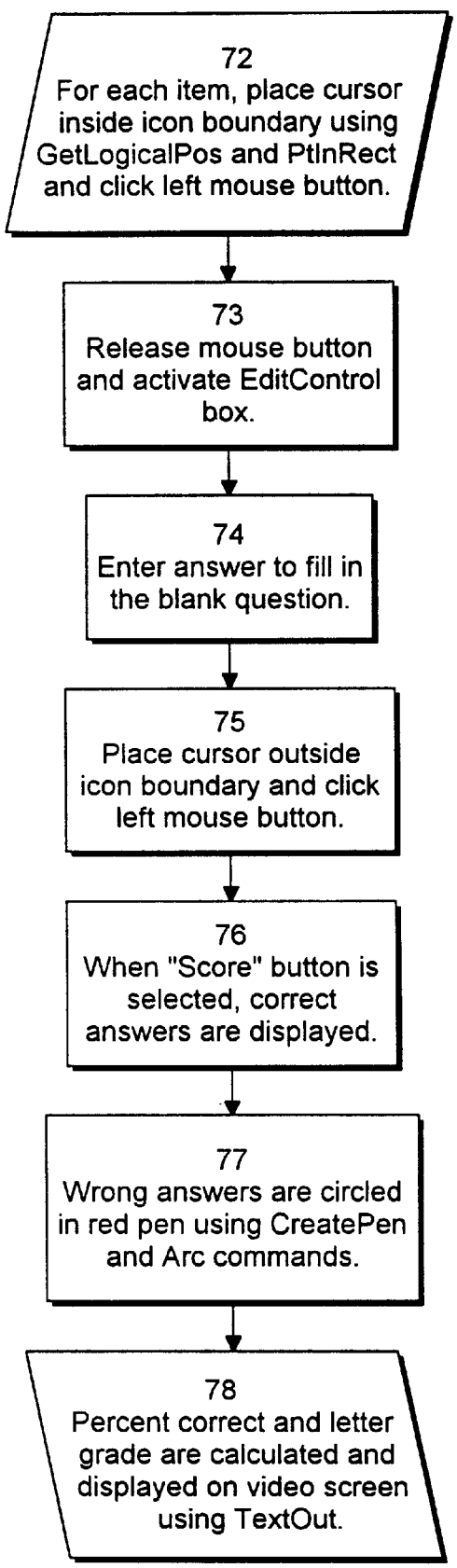
Figure 33:
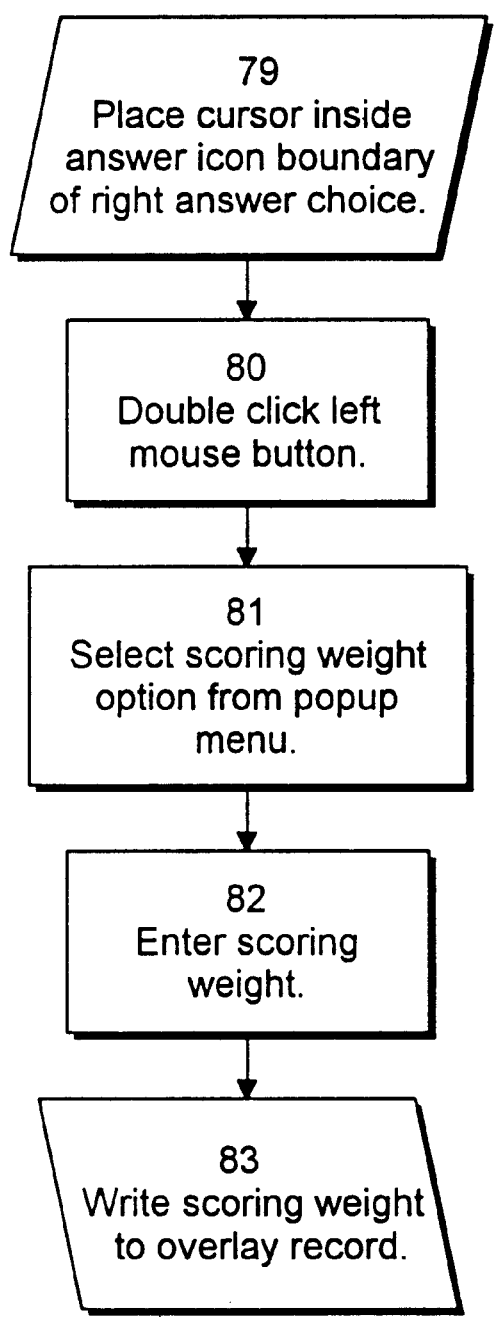
Figure 34:
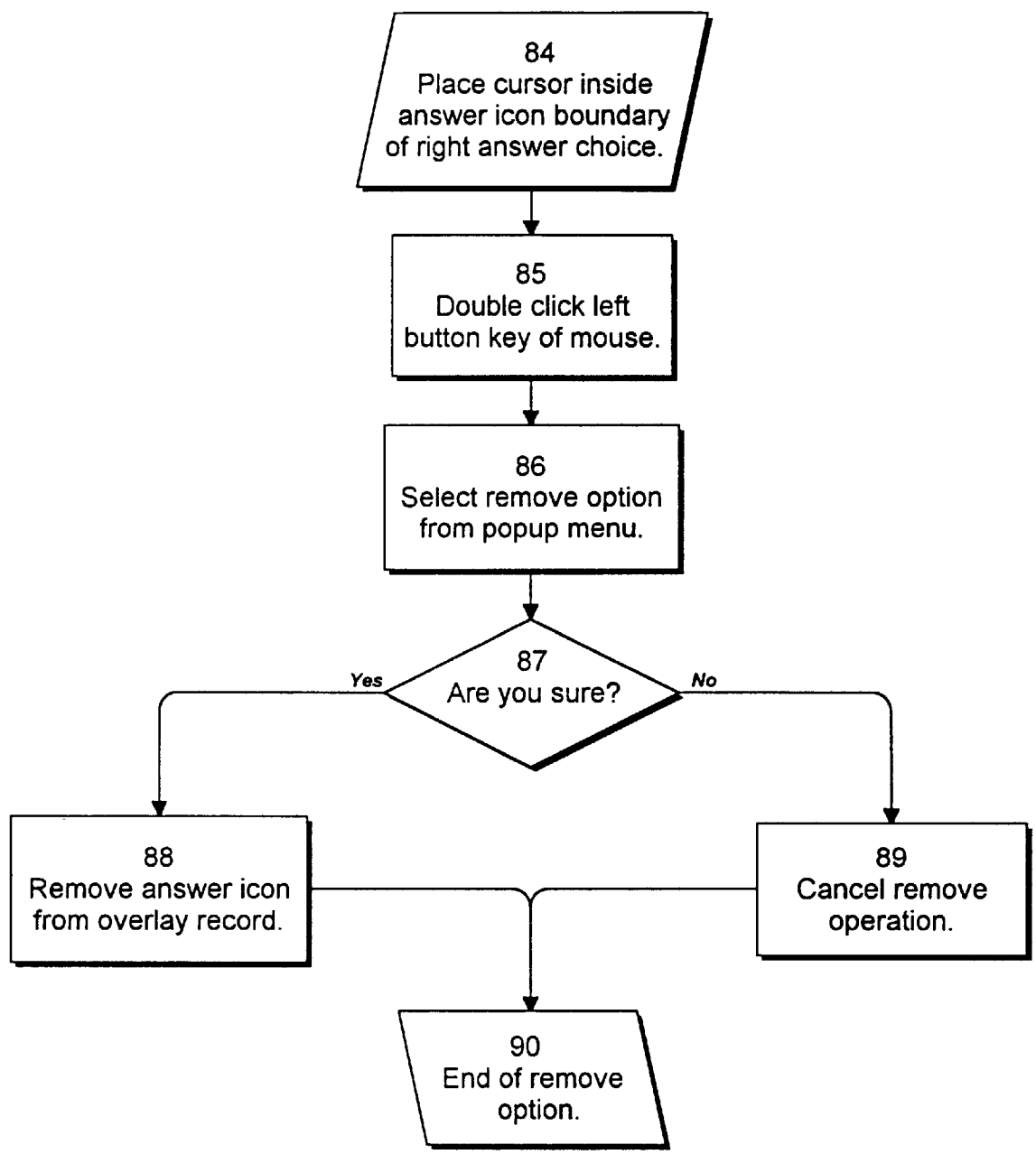

FIG. 25 shows the central steps involved in creating FIG. 11A (drag and drop), FIG. 26 shows the central steps for FIGS. 12A to 16A (draw a box, circle, highlight, "X", or underline), FIG. 27 shows the central steps for FIG. 17A (essay), and FIG. 28 shows the central steps for FIG. 18A (fill in the blank). FIG. 29 shows the central steps involved in the taking and grading of the test of FIG. 11A to produce FIG. 11B (drag and drop), FIG. 30 shows the central steps involved in taking and grading of the tests of FIGS. 12A to 16A to produce FIGS. 12B to 16B (draw a box, circle, highlight, "X", or underline), FIG. 31 shows the central steps involved in taking and grading of the test of FIG. 17A to produce FIG. 17B (essay), and FIG. 32 shows the central steps involved in taking and grading of the test of FIG. 18A to produce FIG. 18B (fill in the blank).

Figure 37:
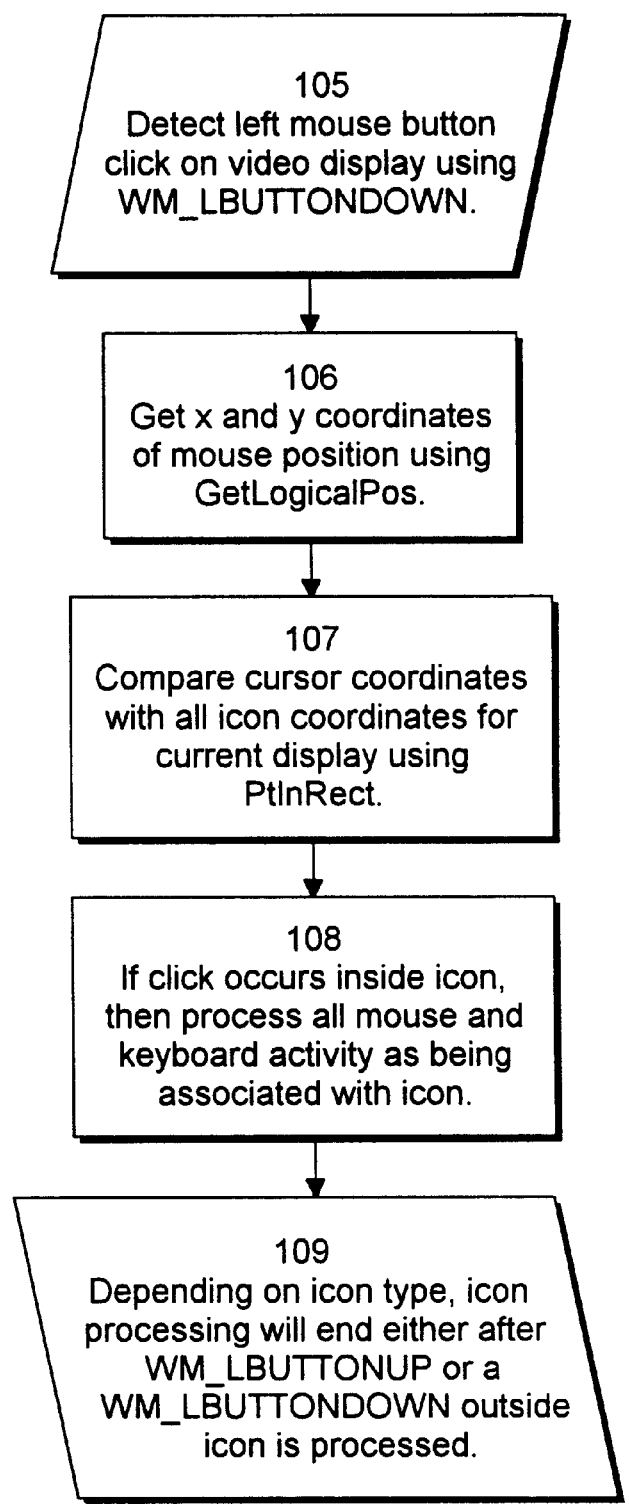
Figure 38:
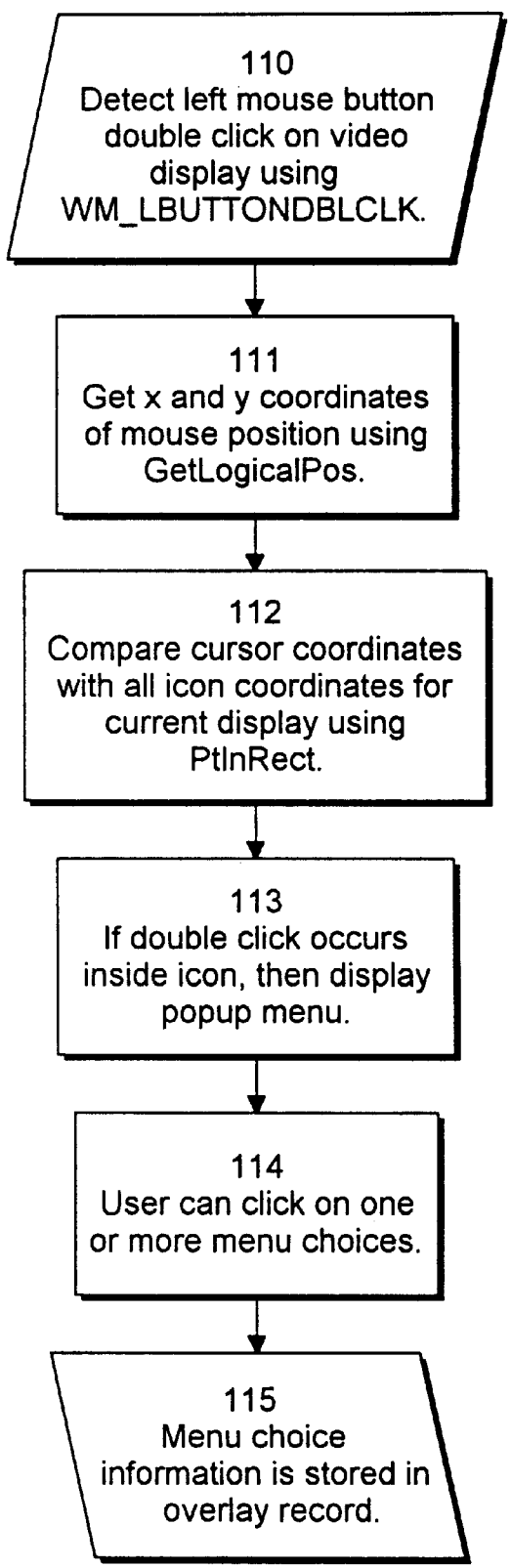

Various of the steps of FIGS. 19–36 involve processing a click or double click by the user. FIGS. 37 and 38 show suitable steps for performing such processing.

Although specific embodiments of the invention have been described and illustrated, it is to be understood that modifications can be made without departing from the invention's spirit and scope.

For example, the layout of the various screen displays, the types of answer icons, the specific shapes of the answer icons, and the types of instructional materials presented to the user can be changed without departing from invention. Similarly, the specific procedures discussed for interacting with the computer readable image, e.g., moving and clicking with a mouse, are not intended to limit the scope of the invention. Along the same lines, a variety of graphical formats can be used in the practice of the invention.

Other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A method for preparing an on-line interactive document, said interaction comprising the provision of an answer to at least one question by a user on a computer, said method comprising:
   (a) creating a captured image of textual, graphical, or textual and graphical material, said material including at least one question requiring an answer by a user, said captured image being computer readable;
   (b) displaying the captured image created in step (a) on a video monitor;
   (c) selecting an on-line interactive answer format from a predetermined plurality of on-line interactive answer formats;
   (d) while the captured image is displayed on the video monitor, graphically applying the on-line interactive answer format selected in step (c) to the captured image and graphically identifying a correct answer to the at least one question for subsequent use in grading a user's response to the question;
   (e) creating an overlay record which comprises:
      (1) an identification of the on-line interactive answer format selected in step (c);
      (2) the location or locations at which that format was applied to the captured image in step (d); and
      (3) the correct answer to the at least one question identified in step (d); and
   (f) storing the captured image and the overlay record in a computer storage medium.

2. The method of claim 1 wherein step (a) is performed by scanning of a sheet of paper containing the textual, graphical, or textual and graphical material.

3. The method of claim 1 wherein step (a) is performed using a word processor, a graphics program, or a spread sheet program.

4. The method of claim 1 wherein at least one of the predetermined plurality of on-line interactive answer formats is selected from the group consisting of: underlining, placing a circle, placing an "X", placing a box, highlighting, filling in a blank, filing in a blank from a set of choices, moving a portion of the image, connecting two portions of the image by a line or curve, and annotating a portion of the image.

5. The method of claim 4 wherein the circle, "X", box, and blank each has a variable size.

6. The method of claim 1 comprising the additional step of associating at least one audio output in computer readable form with the captured image.

7. The method of claim 1 comprising the additional step of associating at least one video output in computer readable form with the captured image.

8. The method of claim 1 comprising the additional step of associating textual material in computer readable form with the captured image.

9. The method of claim 8 wherein the textual material comprises an instructional category.

10. The method of claim 8 wherein the textual material comprises a scoring weight.

11. An on-line instructional method comprising:
   (i) preparing an on-line interactive document, said interaction comprising the provision of an answer to at least one question by a user on a computer, by:

(a) creating a captured image of textual, graphical, or textual and graphical material, said material including at least one question requiring an answer by a user, said captured image being computer readable;
(b) displaying the captured image created in step (a) on a video monitor;
(c) selecting an on-line interactive answer format from a predetermined plurality of on-line interactive answer formats;
(d) while the captured image is displayed on the video monitor, graphically applying the on-line interactive answer format selected in step (c) to the captured image and graphically identifying a correct answer to the at least one question for subsequent use in grading a user's response to the question;
(e) creating an overlay record which comprises:
(1) an identification of the on-line interactive answer format selected in step (c);
(2) the location or locations at which that format was applied to the captured image in step (d); and
(3) the correct answer to the at least one question identified in step (d); and
(f) storing the captured image and the overlay record in a computer storage medium;
(ii) administering the on-line interactive document to a user; and
(iii) recording the user's response to the at least one question in a computer storage medium.

12. The on-line instructional method of claim 11 including the additional step of preparing a report based on the recorded user's response.

13. An article of manufacture comprising a computer usable medium having computer readable code means embodied therein for performing steps (b) through (f) of claim 1.

14. An article of manufacture comprising a computer usable medium having computer readable code means embodied therein for performing steps (ii) and (iii) of claim 11.

15. Apparatus for preparing an on-line interactive document comprising a programmed computer comprising:
means for displaying on a video monitor a computer readable captured image of textual, graphical, or textual and graphical material, said material including at least one question requiring an answer by a user;
means for selecting an on-line interactive answer format from a predetermined plurality of on-line interactive answer formats;
means for graphically applying the selected on-line interactive answer format to the captured image and graphically identifying a correct answer to the at least one question for subsequent use in grading a user's response to the question, said applying and identifying being performed while the captured image is displayed on the video monitor;
means for creating an overlay record which comprises:
(1) an identification of the selected on-line interactive answer format;
(2) the location or locations at which that format was applied to the captured image; and
(3) the identified correct answer to the at least one question; and
means for storing the captured image and the overlay record in a computer storage medium.

16. The apparatus of claim 15 further comprising:
means for administering the on-line interactive document to a user; and
means for recording the user's response to the at least one question in a computer storage medium.

\* \* \* \* \*